(12) United States Patent
Sumner et al.

(10) Patent No.: US 8,181,017 B2
(45) Date of Patent: May 15, 2012

(54) CERTIFICATE RENEWAL

(75) Inventors: Reuben Sumner, Rechovot (IL);
Yaacov Belenky, Maaleh Adumim (IL)

(73) Assignee: NDS Limited, Staines, Middlesex (GB)

( * ) Notice: Subject to any disclaimer, the term of this patent is extended or adjusted under 35 U.S.C. 154(b) by 1322 days.

(21) Appl. No.: 11/587,714

(22) PCT Filed: Sep. 8, 2005

(86) PCT No.: PCT/IL2005/000957
§ 371 (c)(1),
(2), (4) Date: Dec. 4, 2006

(87) PCT Pub. No.: WO2006/043262
PCT Pub. Date: Apr. 27, 2006

(65) Prior Publication Data
US 2008/0091952 A1    Apr. 17, 2008

Related U.S. Application Data

(60) Provisional application No. 60/621,301, filed on Oct. 22, 2004.

(51) Int. Cl.
*H04L 29/06* (2006.01)
(52) U.S. Cl. ............................. 713/157; 713/175; 726/5
(58) Field of Classification Search .................. 713/155, 713/156, 157, 158; 726/5, 10
See application file for complete search history.

(56) References Cited

U.S. PATENT DOCUMENTS

| | | | |
|---|---|---|---|
| 5,261,002 A | 11/1993 | Perlman et al. | |
| 6,490,367 B1 | 12/2002 | Carlsson et al. | |
| 6,868,539 B1 * | 3/2005 | Travison et al. | 717/100 |
| 6,965,994 B1 * | 11/2005 | Brownell et al. | 713/156 |
| 7,613,639 B1 * | 11/2009 | Ogg | 705/35 |
| 7,631,183 B2 * | 12/2009 | Brown et al. | 713/157 |
| 2003/0163687 A1 | 8/2003 | Dare et al. | |
| 2004/0103275 A1 | 5/2004 | Ji et al. | |
| 2004/0148505 A1 * | 7/2004 | Qiu | 713/175 |

OTHER PUBLICATIONS

Klobucar T et al: "Certificate policies formalisation and comparison" Computer Standards and Interfaces, Elsevier Sequoia. Lausanne, CH, vol. 21,. No. 3, Aug. 1, 1999, pp. 299-307, XP004183122 ISSN: 0920-5489.*

Apr. 21, 2009 Office Communication in connection with EP 05 77 7744.3.

(Continued)

*Primary Examiner* — Gilberto Barron, Jr.
*Assistant Examiner* — Devin Almeida
(74) *Attorney, Agent, or Firm* — Husch Blackwell LLP

(57) ABSTRACT

An intermediate certificate authority (ICA) for a hierarchical certificate authority structure (HCAS), the HCAS having a plurality of levels, the levels including a root level, at least one intermediate level, and a leaf level, the root level having a root certificate authority, the ICA being in the at least one intermediate level, the ICA including a certificate receiving module to receive a first certificate signed by a certificate authority in a level above the level of the ICA, the first certificate certifying an aspect of the ICA, the first certificate having an expiration time, and a certificate signing module to sign a second certificate for a member of the HCAS, prior to the expiration time of the first certificate, such that the second certificate expires after the expiration time of the first certificate, the member being in a level below the level of the ICA, the second certificate certifying an aspect of the member. Related apparatus and methods are also described.

8 Claims, 16 Drawing Sheets

OTHER PUBLICATIONS

Tomaz Klobucar et al., "Certificate Policies Formalisation and Comparison", Computer Standards & Interfaces 21 (1999) pp. 299-307.

Andrew Conry-Murray, "PKI: Coming to an Enterprise near You?" (Network Magazine, Aug. 2002, p. 34-38).

T. Dierks et al., "RFC 2246—The TLS Protocol, Version 1.0" (Network Working Group, The Internet Society, Jan. 1999), available on the World Wide Web at http://www/faqs.orefcs/rfc2246.html.

Alan O. Freier et al., "The SSL Protocol, Version 3.0", (Transport Layer Security Working Group, Netscape Communications, Nov. 18, 1996), available on the World Wide Web at http://wp.netscape.com/eng/ss13/draft302.txt.

R. Housley et al., "RFC 3280—Internet X.509 Public Key Infrastructure Certificate and Certificate Revocation List (CRL) Profile" (The Internet Society, Apr. 2002), available on the World Wide Web at http:www.ietf.org/rfc/rfc3280.txt.

J. Lopez, et al., "Distributed Storage and Revocation in Digital Certificate Databases" (Database and Expert Systems Applications, 11th International Conference, DEXA 2000, proceedings p. 929-38) (Lecture Notes in Computer Science vol. 1873), published by Springer-Verlag, Berlin, Germany).

Ravi Mukkamala, et al., "A Novel Approach to Certificate Revocation Management" (Database and Application Security XV.IFJJP TC1 1/WG11.3 Fifteenth Annual Working Conference on Database and Application Security 2002, p. 225-38, published by Kluwer Academic Publishers, Norwell, MA. USA.

Jun. 24, 2010 Office Communication in connection with prosecution of AU 2009 222621.

* cited by examiner

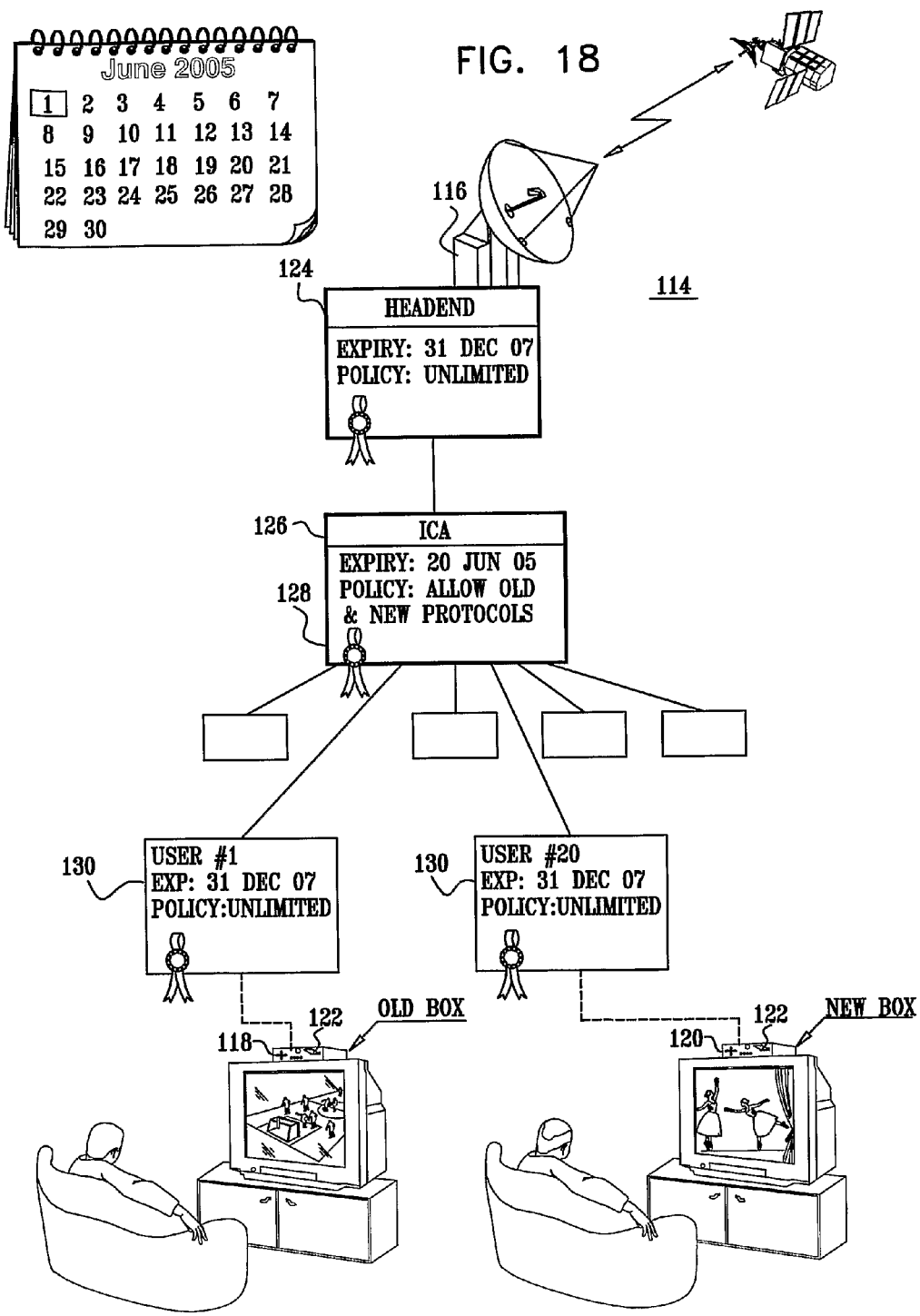

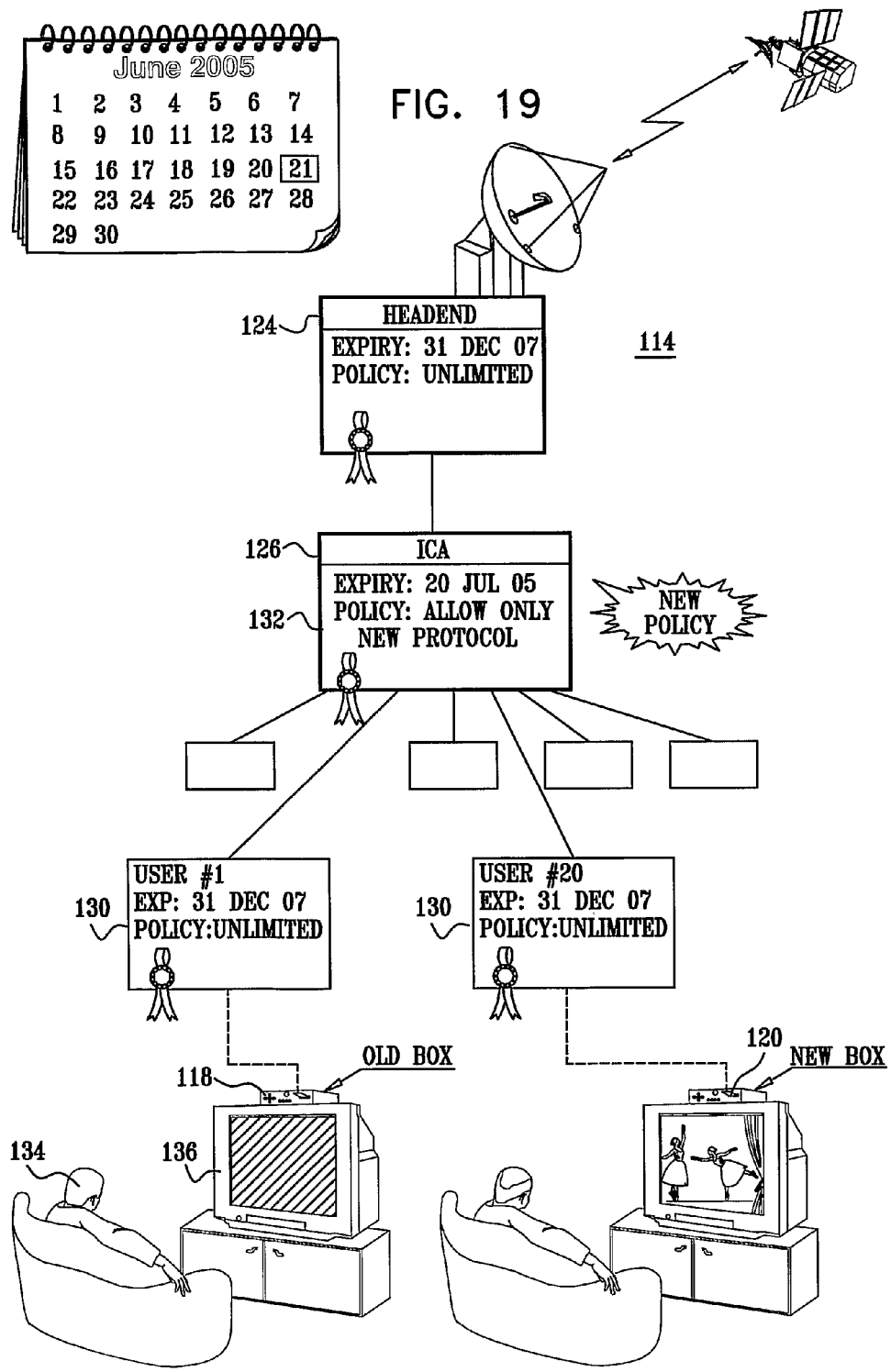

CERTIFICATE RENEWAL

RELATED APPLICATION INFORMATION

The present application is a 35 USC §371 application of PCT/IL2005/000957, filed on 8 Sep. 2005 and entitled "Certificate Renewal", which was published on 27 Apr. 2006 in the English language with International Publication Number WO 2006/043262 A2 (a corrected version was republished on 21 Sep. 2006 in the English language with International Publication Number WO 2006/043262 A3), an which relies for priority on U.S. Provisional Patent Application Ser. No. 60/621,301 of Sumner, et al, filed 22 Oct. 2004, the disclosure of which is hereby incorporated herein by reference.

FIELD OF THE INVENTION

The present invention relates to hierarchical certificate authority structures and, in particular, to certificate renewal in hierarchical certificate authority structures.

BACKGROUND OF THE INVENTION

By way of introduction, an approach to digital security that is commonly used is for a certificate authority (CA) which is trusted and empowered to create and sign certificates, to issue a certificate to a certificate holder. The holder can then provide the certificate to a third party as an attestation by the CA that: the holder who is named in the certificate is in fact the person, entity, machine, email address user, etc., that is set forth in the certificate; and typically that a public key in the certificate is, in fact, the holder's public key.

People, devices, processes or other entities dealing with the certificate holder can rely upon the certificate in accordance with the CA's certification practice statement.

A certificate is typically created by the CA digitally signing, with its own private key, identifying information submitted to the CA along with the public key of the holder who seeks the certificate. A certificate usually has an expiration time and/or date, and can be revoked earlier in the event of compromise of the corresponding private key of the certificate holder, or other revocable event.

A public-key infrastructure (PKI), for example, but not limited to, Secure Sockets Layer (SSL) or Transport Layer Security (TLS) (RFC 2246), uses a hierarchical certificate authority structure having a root level, one or more intermediate levels below the root level and a leaf level at the bottom of the hierarchy. The root level preferably includes a root CA. The intermediate levels preferably include one or more intermediate CAs.

Another example of a PKI is described in "RFC 3280-Internet X.509 Public Key Infrastructure Certificate and Certificate Revocation List (CRL) Profile".

Each client, for example, but not limited to, a web browser, is typically configured with a number of root CA certificates. When establishing a connection with a new entity, such as another web server, the new entity typically provides a chain of certificates going back to the root CA which issued the first certificate in the certificate chain.

Each certificate typically contains the following: a public key; an identity of the certifying secure entity; and optionally policies associated with the secure entity. Each certificate is preferably signed by a private key corresponding to a public key in the next (parent) certificate until reaching the root.

The client generally validates each signature along the chain to come to the conclusion that, indirectly, the root CA is certifying the identity and policies associated with the new entity (for example, that its name is John Doe, that it is valid, that it is entitled to enter a given door, or that it is a web site with a domain name such as www.yet-another-online-store-.com, etc.)

As described above, each certificate typically has an expiry date, and is generally treated as valid only till the expiry date, provided that it is not revoked beforehand. Certificates in the leaf level are generally issued with expiry dates, and typically short lifetimes, for several reasons. First, the probability of certificates needing to be revoked is reduced, thereby preventing certificate revocation lists growing unbounded over time. Second, certificates with expiry dates have a business motivation. For example, entities must renew their certificates with the certificate authority intermittently, and pay for it. Third, certificates with expiry dates enable the signing CA to occasionally change the policies of the certificates.

Therefore, certificate expiration, and typically certificates with a short lifetime, is desired in a certificate system. Certificate renewal typically involves generation and transmission of the certificates requiring processing and bandwidth, respectively. In a system with a large number of leaf entities the process of certificate renewal generally requires a large processing overhead and bandwidth.

The following references are also believed to represent the state of the art:

US Published Patent Application 2004/0148505 of Qui;

"PKI: Coming to an Enterprise Near You?" by Andrew Conry-Murray, Network Magazine, August 2002;

"Distributed Storage and Revocation in Digital Certificate Databases" by Javier Lopez, Antonio Mana, Juan J. Ortega and Jose M. Troya, Database and expert systems applications, 11th International Conference, DEXA 2000, proceedings (Lecture Notes in Computer Science Vol. 1873), published by Springer-Verlag, Berlin, Germany; and "A novel approach to certificate revocation management" by Ravi Mukkamala and Sushil Jajodia, Database and Application Security XV. IFIP TC11/WG11.3 Fifteenth Annual Working Conference on Database and Application Security 2002, published by Kluwer Academic Publishers, Norwell, Mass., USA.

The disclosures of all references mentioned above and throughout the present specification, as well as the disclosures of all references mentioned in those references, are hereby incorporated herein by reference.

SUMMARY OF THE INVENTION

The present invention, in preferred embodiments thereof, seeks to provide improved method and system for handling certificate renewals.

The present invention, in preferred embodiments thereof, comprises a method and system that is particularly useful in cases where there is a large class of devices which have certificates which: are due to expire almost simultaneously; or need to be revoked simultaneously at some unknown future date; and/or have policy fields that need to be changed nearly simultaneously in the same way. For example, in a conditional access system with replaceable security elements, such as smart cards, it may be desirable to forbid communications with an old generation of conditional access elements once replaced by a new generation of conditional access elements, even in cases where such a transition is only known a short time in advance.

There is thus provided in accordance with a preferred embodiment of the present invention an intermediate certificate authority (ICA) for a hierarchical certificate authority structure (HCAS), the HCAS having a plurality of levels, the levels including a root level, at least one intermediate level, and a leaf level, the root level having a root certificate authority, the ICA being in the at least one intermediate level, the ICA including a certificate receiving module to receive a first certificate signed by a certificate authority in a level above the level of the ICA, the first certificate certifying an aspect of the ICA, the first certificate having an expiration time, and a certificate signing module to sign a second certificate for a member of the HCAS, prior to the expiration time of the first certificate, such that the second certificate expires after the expiration time of the first certificate, the member being in a level below the level of the ICA, the second certificate certifying an aspect of the member.

Further in accordance with a preferred embodiment of the present invention the member is a smart card.

Still further in accordance with a preferred embodiment of the present invention the member is part of a conditional access system.

Additionally in accordance with a preferred embodiment of the present invention the second certificate certifies a security policy of the member.

Moreover in accordance with a preferred embodiment of the present invention the first certificate and the second certificate certify an identity of the ICA and the member, respectively.

Further in accordance with a preferred embodiment of the present invention the first certificate has a lifetime, and the second certificate has a lifetime which is longer than the lifetime of the first certificate.

Still further in accordance with a preferred embodiment of the present invention the first certificate has a policy associated with the ICA, and the certificate signing module includes a policy determination sub-module to issue the second certificate with a policy which allows at least one operation that the policy of the first certificate does not allow.

Additionally in accordance with a preferred embodiment of the present invention the first certificate and the second certificate certify a policy of the ICA and the member, respectively.

Moreover in accordance with a preferred embodiment of the present invention the policy is a security policy.

Further in accordance with a preferred embodiment of the present invention the policy is a bandwidth policy.

Still further in accordance with a preferred embodiment of the present invention the first certificate and the second certificate include a public key and an identity of a certifying entity.

Additionally in accordance with a preferred embodiment of the present invention the first certificate and the second certificate are signed by a private key corresponding to a public key of the level above the ICA and the member, respectively.

There is also provided in accordance with still another preferred embodiment of the present invention an intermediate certificate authority (ICA) for a hierarchical certificate authority structure (HCAS), the HCAS having a plurality of levels, the levels including a root level, at least one intermediate level, and a leaf level, the root level having a root certificate authority, the ICA being in the at least one intermediate level, the ICA including a certificate receiving module to receive a first certificate from a certificate authority in a level above the level of the ICA, the first certificate certifying an aspect of the ICA, the first certificate having a lifetime, and a certificate signing module to sign a second certificate for a member of the HCAS, during the lifetime of the first certificate, such that the second certificate has a lifetime which is longer than the lifetime of the first certificate, the member being in a level below the level of the ICA, the second certificate certifying an aspect of the member.

Moreover in accordance with a preferred embodiment of the present invention the member is a smart card.

Further in accordance with a preferred embodiment of the present invention the member is part of a conditional access system.

Still further in accordance with a preferred embodiment of the present invention the second certificate certifies a security policy of the member.

Additionally in accordance with a preferred embodiment of the present invention the first certificate and the second certificate certify an identity of the ICA and the member, respectively.

Moreover in accordance with a preferred embodiment of the present invention the first certificate has a policy associated with the ICA, and the certificate signing module includes a policy determination sub-module to issue the second certificate with a policy which allows at least one operation that the policy of the first certificate does not allow.

Further in accordance with a preferred embodiment of the present invention the first certificate and the second certificate certify a policy of the ICA and the member, respectively.

Still further in accordance with a preferred embodiment of the present invention the policy is a security policy.

Additionally in accordance with a preferred embodiment of the present invention the policy is a bandwidth policy.

Moreover in accordance with a preferred embodiment of the present invention the first certificate and the second certificate include a public key and an identity of a certifying entity.

Further in accordance with a preferred embodiment of the present invention the first certificate and the second certificate are signed by a private key corresponding to a public key of the level above the ICA and the member, respectively.

There is also provided in accordance with still another preferred embodiment of the present invention an intermediate certificate authority (ICA) for a hierarchical certificate authority structure (HCAS), the HCAS having a plurality of levels, the levels including a root level, at least one intermediate level, and a leaf level, the root level having a root certificate authority, the ICA being in the at least one intermediate level, the ICA including a certificate receiving module to receive a first certificate from a certificate authority in a level above the level of the ICA, the first certificate certifying an aspect of the ICA, the first certificate having a policy associated with the ICA, and a lifetime, and a certificate signing module to sign a second certificate for a member of the HCAS, during the lifetime of the first certificate, such that the second certificate has a policy which allows at least one operation that the policy of the first certificate does not allow, the member being in a level below the level of the ICA, the second certificate certifying an aspect of the member.

Still further in accordance with a preferred embodiment of the present invention the member is a smart card.

Additionally in accordance with a preferred embodiment of the present invention the member is part of a conditional access system.

Moreover in accordance with a preferred embodiment of the present invention the policy is a security policy.

Further in accordance with a preferred embodiment of the present invention the policy is a bandwidth policy.

Still further in accordance with a preferred embodiment of the present invention the first certificate and the second certificate include a public key and an identity of a certifying entity.

Additionally in accordance with a preferred embodiment of the present invention the first certificate and the second certificate are signed by a private key corresponding to a public key of the level above the ICA and the member, respectively.

There is also provided in accordance with still another preferred embodiment of the present invention a method for issuing certificates in a hierarchical certificate authority structure (HCAS), the HCAS having a plurality of levels, the levels including a root level, at least one intermediate level, and a leaf level, the root level having a root certificate authority, the at least one intermediate level having an intermediate certificate authority (ICA), the method including receiving a first certificate from a certificate authority in a level above the level of the ICA, the first certificate certifying an aspect of the ICA, the first certificate having an expiration time, and signing a second certificate for a member of the HCAS, prior to the expiration time of the first certificate, such that the second certificate expires after the expiration time of the first certificate, the member being in a level below the level of the ICA, the second certificate certifying an aspect of the member.

There is also provided in accordance with still another preferred embodiment of the present invention a method for issuing certificates in a hierarchical certificate authority structure (HCAS), the HCAS having a plurality of levels, the levels including a root level, at least one intermediate level, and a leaf level, the root level having a root certificate authority, the at least one intermediate level having an intermediate certificate authority (ICA), the method including receiving a first certificate from a certificate authority in a level above the level of the ICA, the first certificate certifying an aspect of the ICA, the first certificate having a lifetime, and signing a second certificate to a member of the HCAS, during the lifetime of the first certificate, such that the second certificate has a lifetime which is longer than the lifetime of the first certificate, the member being in a level below the level of the ICA, the second certificate certifying an aspect of the member.

There is also provided in accordance with still another preferred embodiment of the present invention a method for issuing certificates in a hierarchical certificate authority structure (HCAS), the HCAS having a plurality of levels, the levels including a root level, at least one intermediate level, and a leaf level, the root level having a root certificate authority, the at least one intermediate level having an intermediate certificate authority (ICA), the method including receiving a first certificate from a certificate authority in a level above the level of the ICA, the first certificate certifying an aspect of the ICA, the first certificate having a policy associated with the ICA, and signing a second certificate for a member of the HCAS, during a lifetime of the first certificate, such that the second certificate has a policy which allows at least one operation that the policy of the first certificate does not allow, the member being in a level below the level of the ICA, the second certificate certifying an aspect of the member.

There is also provided in accordance with still another preferred embodiment of the present invention a secure self configuration device, including a certificate receiving module to receive a certificate from a certificate authority, the certificate certifying an aspect of the device, and a configuration module to self-configure the device based on the aspect of the certificate.

Moreover in accordance with a preferred embodiment of the present invention the aspect is a security policy of the device.

Further in accordance with a preferred embodiment of the present invention the aspect is a bandwidth policy of the device.

There is also provided in accordance with still another preferred embodiment of the present invention a method for self-configuring a device, including receiving a certificate from a certificate authority, the certificate certifying an aspect of the device, and self-configuring the device based on the aspect of the certificate.

There is also provided in accordance with still another preferred embodiment of the present invention a system for validating a certificate chain of a hierarchical certificate authority structure (HCAS), the HCAS having a plurality of levels, the levels including a root level, at least one intermediate level, and a leaf level, the at least one intermediate level having an intermediate certificate authority (ICA), the leaf level having a member, the ICA receiving a first certificate, the ICA signing a second certificate for the member, the certificate chain including a plurality of certificates, the certificates including the first certificate and the second certificate, the system including a certificate receiving module to receive the certificates of the certificate chain, and a certificate chain validation module to determine an effective policy of the certificate chain such that the effective policy only allows operations commonly permissible to each of the certificates in the certificate chain.

There is also provided in accordance with still another preferred embodiment of the present invention a system for validating a certificate chain of a hierarchical certificate authority structure (HCAS), the HCAS having a plurality of levels, the levels including a root level, at least one intermediate level, and a leaf level, the at least one intermediate level having an intermediate certificate authority (ICA), the leaf level having a member, the ICA receiving a first certificate, the ICA signing a second certificate for the member, the certificate chain including a plurality of certificates, the certificates including the first certificate and the second certificate, the system including a certificate receiving module to receive the certificates of the certificate chain, and a certificate chain validation module to determine an effective expiry date of the certificate chain to be an earliest expiry date of the certificates in the certificate chain.

There is also provided in accordance with still another preferred embodiment of the present invention a method for validating a certificate chain of a hierarchical certificate authority structure (HCAS), the HCAS having a plurality of levels, the levels including a root level, at least one intermediate level, and a leaf level, the at least one intermediate level having an intermediate certificate authority (ICA), the leaf level having a member, the ICA receiving a first certificate, the ICA signing a second certificate for the member, the certificate chain including a plurality of certificates, the certificates including the first certificate and the second certificate, the method including receiving the certificates of the certificate chain, and determining an effective policy of the certificate chain such that the effective policy only allows operations commonly permissible to each of the certificates in the certificate chain.

There is also provided in accordance with still another preferred embodiment of the present invention a method for validating a certificate chain of a hierarchical certificate authority structure (HCAS), the HCAS having a plurality of levels, the levels including a root level, at least one intermediate level, and a leaf level, the at least one intermediate level having an intermediate certificate authority (ICA), the leaf level having a member, the ICA receiving a first certificate, the ICA signing a second certificate for the member, the certificate chain including a plurality of certificates, the certificates including the first certificate and the second certificate, the method including receiving the certificates of the certificate chain, and determining an effective expiry of the certificate chain to be an earliest expiry date of the certificates in the certificate chain.

BRIEF DESCRIPTION OF THE DRAWINGS

The present invention will be understood and appreciated more fully from the following detailed description, taken in conjunction with the drawings in which:

FIG. 18 is a partly pictorial, partly block diagram view of a certificate authority system for use with the secure self-configuration device of FIG. 16 constructed and operative in accordance with a fourth alternative preferred embodiment of the present invention; and FIG. 19 is a partly pictorial, partly block diagram view of the system of FIG. 18 after all the new boxes have been delivered.

DETAILED DESCRIPTION OF A PREFERRED EMBODIMENT

Persons skilled in the art will appreciate that, throughout the present application, a certificate having an expiration date is used by way of example only, and that the present invention is not limited to a particular type of expiration period, but rather includes any suitable expiration period, for example, but not limited to, an expiration time.

By way of introduction, the present invention, in preferred embodiments thereof, provides an improved system and method for certificate renewal where certificates of a certain class need to be renewed or revoked at a certain unknown date in the future.

A solution is to send out regular certificate renewals to all devices, the certificates having a very short lifetime. However, such a solution requires tremendous resources, both computational and in terms of bandwidth.

Figure 1:
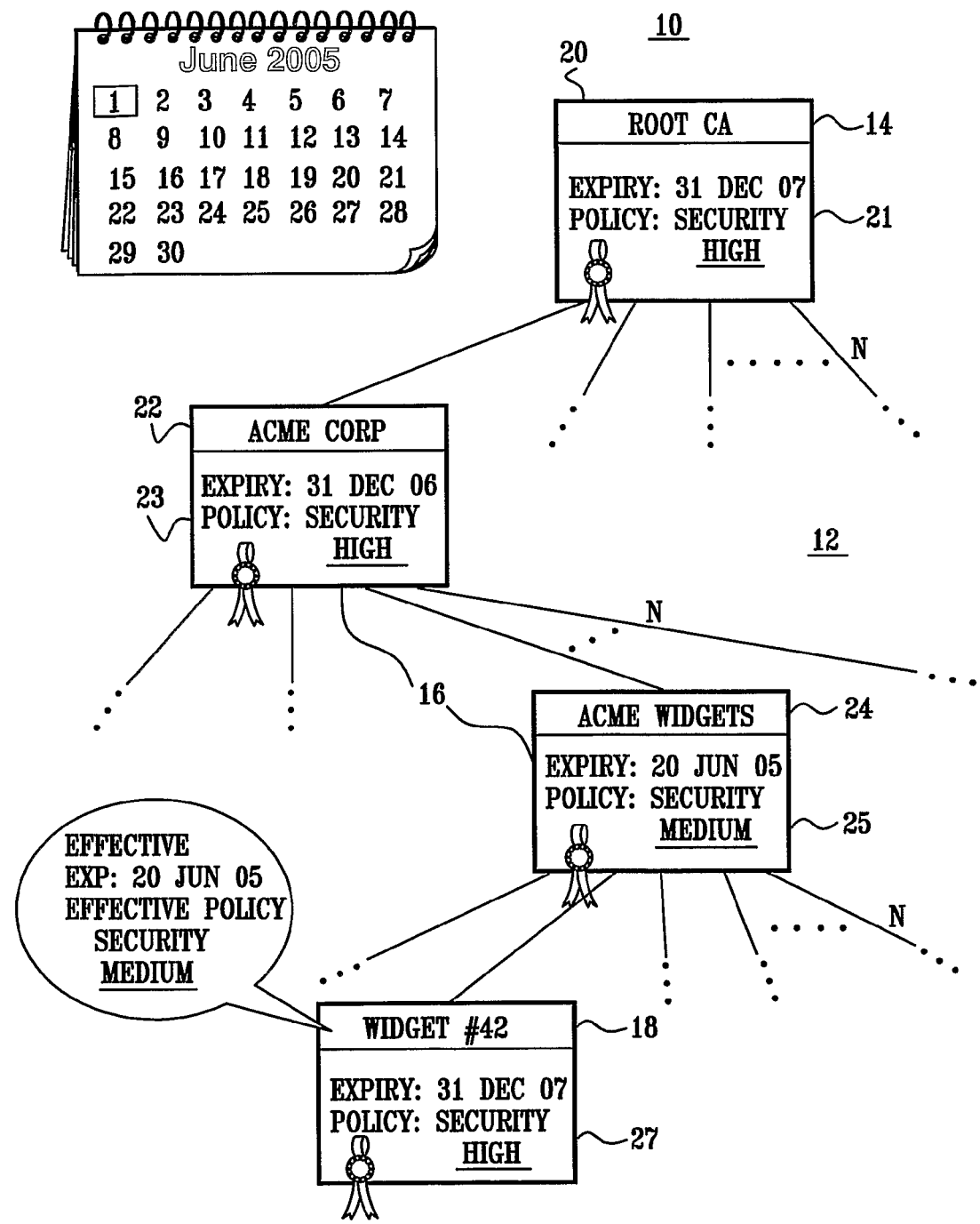
FIG. 1 is a partly pictorial, partly block diagram view of a certificate authority system constructed and operative in accordance with a preferred embodiment of the present invention.

Another solution is to create a certificate authority (CA) for the class of devices, and revoke the certificate for the CA, when necessary, thereby invalidating the entire certificate chain. Unfortunately certificate revocation lists are generally problematic, at least because revocations generally raise objections by the owners of the revoked devices. Reference is now made to FIG. 1, which is a partly pictorial, partly block diagram view of a CA system 10 constructed and operative in accordance with a preferred embodiment of the present invention. The CA system 10 preferably includes a hierarchical CA structure (HCAS) 12. The HCAS 12 generally includes a plurality of levels. The levels typically include a root level 14, two intermediate levels 16 and a leaf level 18. It will be appreciated by those ordinarily skilled in the art that the HCAS 12 can include one or more intermediate levels.

The root level 14 generally has a root CA 20. The upper intermediate level 16 typically has a plurality of intermediate CAs, including ACME Corp 22 for example. The lower intermediate level 16 typically has a plurality of intermediate CAs, including ACME Widgets 24 for example. ACME widgets 24 is a "child" of ACME Corp 22. The leaf level 18 generally includes a plurality of members, entities or devices, for example, but not limited to, WIDGET #42 and the other WIDGETS (not shown). WIDGET #42, and the other WIDGETS are "children" of ACME widgets 24.

On 1 Jun. 2005, for example, the root CA 20 signs a certificate 21 for itself. The certificate 21 expires on 31 Dec. 2007. The certificate 21 has a high security policy, which means that the root CA 20 is allowed to perform operations up to, and including, high security operations.

The root CA 20 signs a certificate 23 for ACME Corp 22. The certificate 23 expires on 31 Dec. 2006 and has a high security policy.

In turn, ACME Corp 22 signs a certificate 25 for ACME widgets 24. The certificate 25 expires on 20 Jun. 2005 and has a medium security policy, which means that ACME widgets 24 is allowed to perform operations up to, and including, medium security operations.

ACME Corp 22 signs a certificate 27 for WIDGET #42 and all the other WIDGETS below ACME Corp 22, the signed certificate 27 expiring on 31 Dec. 2007 and having a high security policy.

The above signing by all the CAs took place on 1 Jun. 2005. However, it will be appreciated by those ordinarily skilled in the art that the signing of the certificates 21, 23, 25, 27 does not need to take place at the same time, or even on the same day. Generally, a certificate is signed before the expiration of the certificate of the signing CA. In other words a certificate is typically signed during the lifetime of the certificate of the signing CA.

The certificates preferably certify aspects of the holder, for example, but not limited to, an identity of the certificate holder, a policy of the certificate holder, for example, but not limited to, a security policy and/or a bandwidth policy. The certificates typically include a public key of the holder. Additionally, the certificates are preferably signed by a private key corresponding to a public key of the CA which signs the certificate.

It should be noted that the certificate 25 held by ACME widgets 24 has an expiry date of 20 Jun. 2005 and a medium security policy. However, ACME widgets 24 signs the certificates 27 for all the WIDGETS, including WIDGET #42, with an expiry date of 31 Dec. 2007 and a high security policy.

Therefore, it is seen that ACME widgets 24 signs the certificates 27 which expire after the expiry date of the certificate 25 held by ACME widgets 24. Therefore, the lifetime of the certificates 27 held by the WIDGETS, is longer than the lifetime of the certificate 25 held by ACME widgets 24. Also, the policy of the certificates 27 held by the WIDGETS allows at least one operation that the policy of the certificate 25 held by ACME widgets 24 does not allow. In other words, the policy of the certificate 27 allows performance of operations up to high security operations, whereas the policy of the certificate 25 only allows performance of operations up to medium security.

The certificate chain of WIDGET #42 includes the certificate 21 of the root CA 20, the certificate 23 of ACME Corp 22, the certificate 25 of ACME widgets 24 and the certificate 27 of WIDGET #42. The certificate chain is valid if all the certificates 21, 23, 25, 27 in the certificate chain are valid. If any one of the certificates 21, 23, 25, 27 expires, the certificate chain expires. So the certificate chain of this example has an effective expiry date of 20 Jun. 2005, which is the expiry date of the certificate 25 of ACME widgets 24. Additionally, the effective policy of the certificate chain is determined such that the effective policy only allows operations commonly permissible to each of the certificates 21, 23, 25, 27 in the certificate chain. Therefore, the effective policy of the certificate chain is medium security, which is the policy of the certificate 25 of ACME widgets 24.

It is seen that the expiration of the certificate chain and the effective policy of the certificate 27 of WIDGET #42, and the certificates 27 of all the other WIDGETS, is generally dependent upon the certificate 25 of ACME widgets 24.

Therefore, the certificates 27 of the WIDGETS are given long, if not infinite, expiration dates, with a broad, if not unlimited, policy (high security). The certificate 25 of ACME widgets 24 on the other hand, is given a short expiry date and a more narrow security policy (medium security). The certificate 25 of ACME widgets 24 is typically renewed regularly. The expiration and effective policy of the certificate chain of the WIDGETS are controllable via renewing the certificate 25 of, or signing a new certificate with updated policies for, ACME widgets 24. This feature is described in more detail with reference to FIGS. 2 to 5 below.

The renewal/update of the certificate 25 of ACME widgets 24 typically requires very little computation compared to renewing the certificates 27 of all the WIDGETS individually. Furthermore, in a broadcast environment, the new certificate 25 held by ACME widgets 24 is typically easily sent to all the WIDGETS by broadcasting a single certificate 25 to all the WIDGETS and does not require unicast communication. Unicast communication is defined in the present specification and claims as one-to-one transmission.

In accordance with the prior art, it is generally accepted practice that the leaf certificate expiration is the effective expiration of the entire certificate chain and that it is forbidden for a CA to sign a certificate which has an expiration date later than the expiration date of the signing CA. It will be appreciated by those ordinarily skilled in the art that: the system 10 generally requires that an intermediate CA can sign a certificate which has an expiration date which is later than the expiration date of the current certificate held by the signing intermediate CA; and the effective expiration date of the certificate chain is typically the earliest expiration date of all the certificates in the certificate chain. Therefore, the present invention, in preferred embodiments thereof, requires that no check be performed on the relative expiration dates of elements of the certificate chain as an issuing CA is allowed to issue certificates having a longer expiry date than the expiry date of the certificate of the issuing CA itself.

The same idea is applied to policy fields. Namely, the present invention preferably determines that the effective policy of the certificate chain such that the effective policy only allows operations commonly permissible to each of the certificates in the certificate chain.

In general, in accordance with the preferred embodiment of the present invention, leaf devices receive certificates with very long, if not infinite, expiration dates, and broad, if not unlimited, policy values. At the same time, an intermediate CA, above the leaf devices, preferably has a certificate with a short expiration date and is renewed periodically. Each renewal of the certificate of the intermediate CA generally allows for the policy fields of the certificate to be updated.

The effective expiry and effective policy of the leaf devices is preferably controlled by renewal of the certificate of the CA directly above the leaf devices. However, it will be appreciated by those ordinarily skilled in the art that the effective expiry and effective policy of the leaf devices can be controlled by a CA which is one or more levels above the CA that signs the certificates for the leaf devices.

Figure 2:
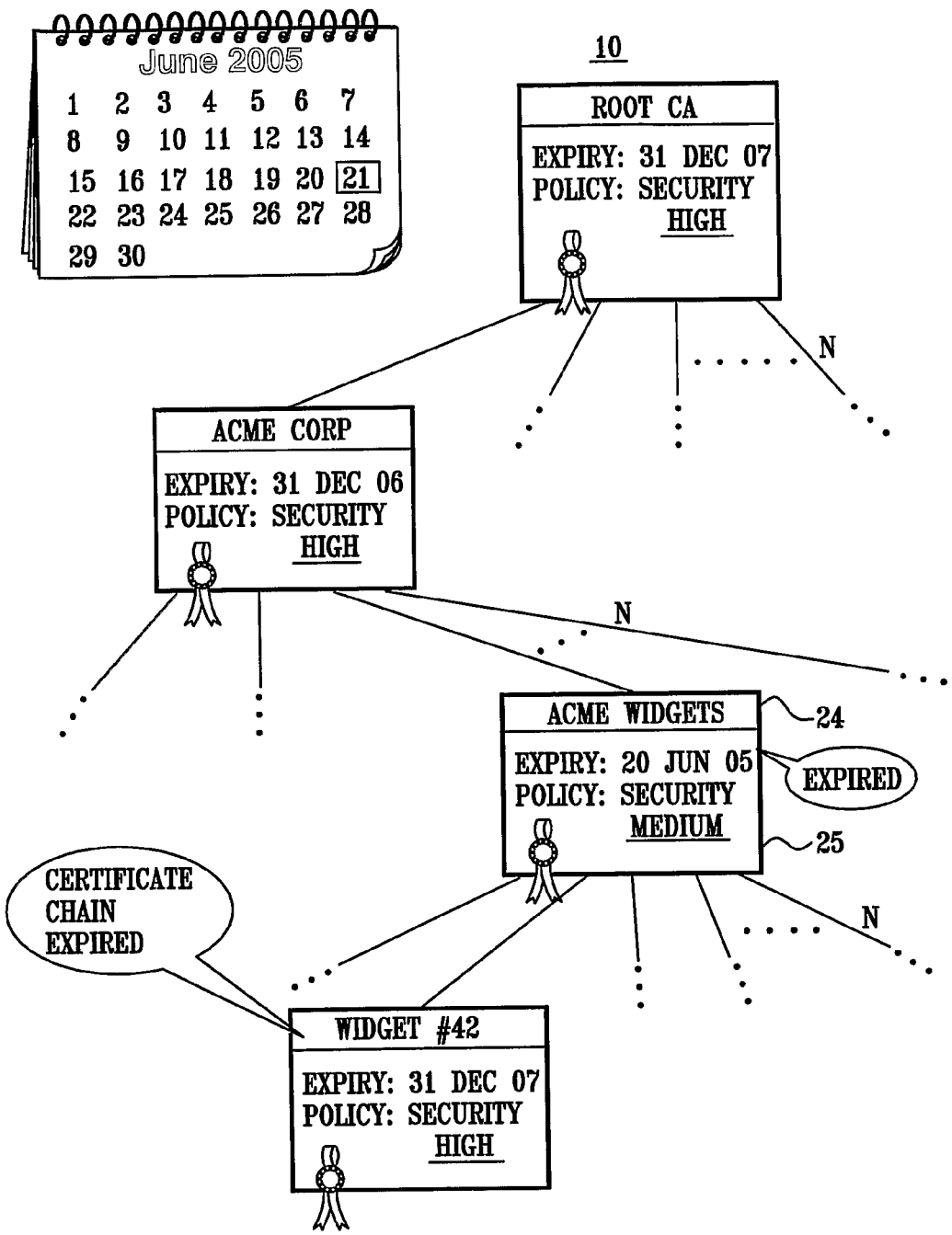
FIG. 2 is a partly pictorial, partly block diagram view of the system of FIG. 1 showing an expired certificate chain.

Reference is now made to FIG. 2, which is a partly pictorial, partly block diagram view of the system 10 of FIG. 1 showing an expired certificate chain. After 20 Jun. 2005 the certificate 25 of ACME widgets 24 expired. Therefore, the certificate chain of WIDGET #42 has expired.

Figure 3:
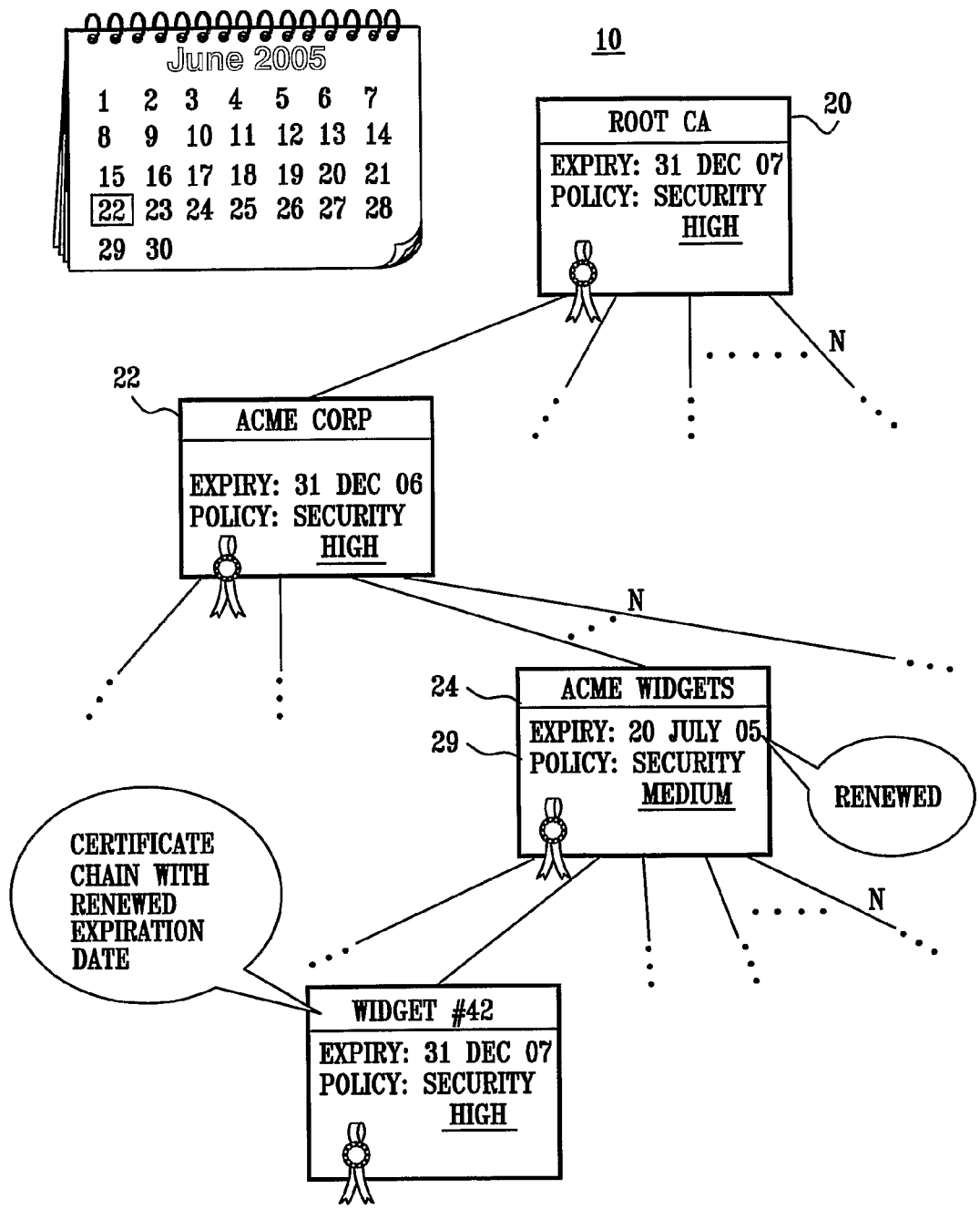
FIG. 3 is a partly pictorial, partly block diagram view of the system of FIG. 2 showing a certificate chain with a renewed expiration date after certificate renewal.

Reference is now made to FIG. 3, which is a partly pictorial, partly block diagram view of the system 10 of FIG. 2 showing a certificate chain with a renewed expiration time after certificate renewal. On 22 Jun. 2005 ACME Corp 22 signed a new certificate 29 for ACME widgets 24 with the same public-key used to sign the expired certificate 25 (FIG. 2), but with a later expiration, 20 Jul. 2005 in this example. The new certificate 29 is sent to WIDGET #42. With receipt of the new certificate 29 by WIDGET #42, the certificate chain from the root CA 20 to WIDGET #42 is effectively renewed with a new effective expiration.

Figure 4:
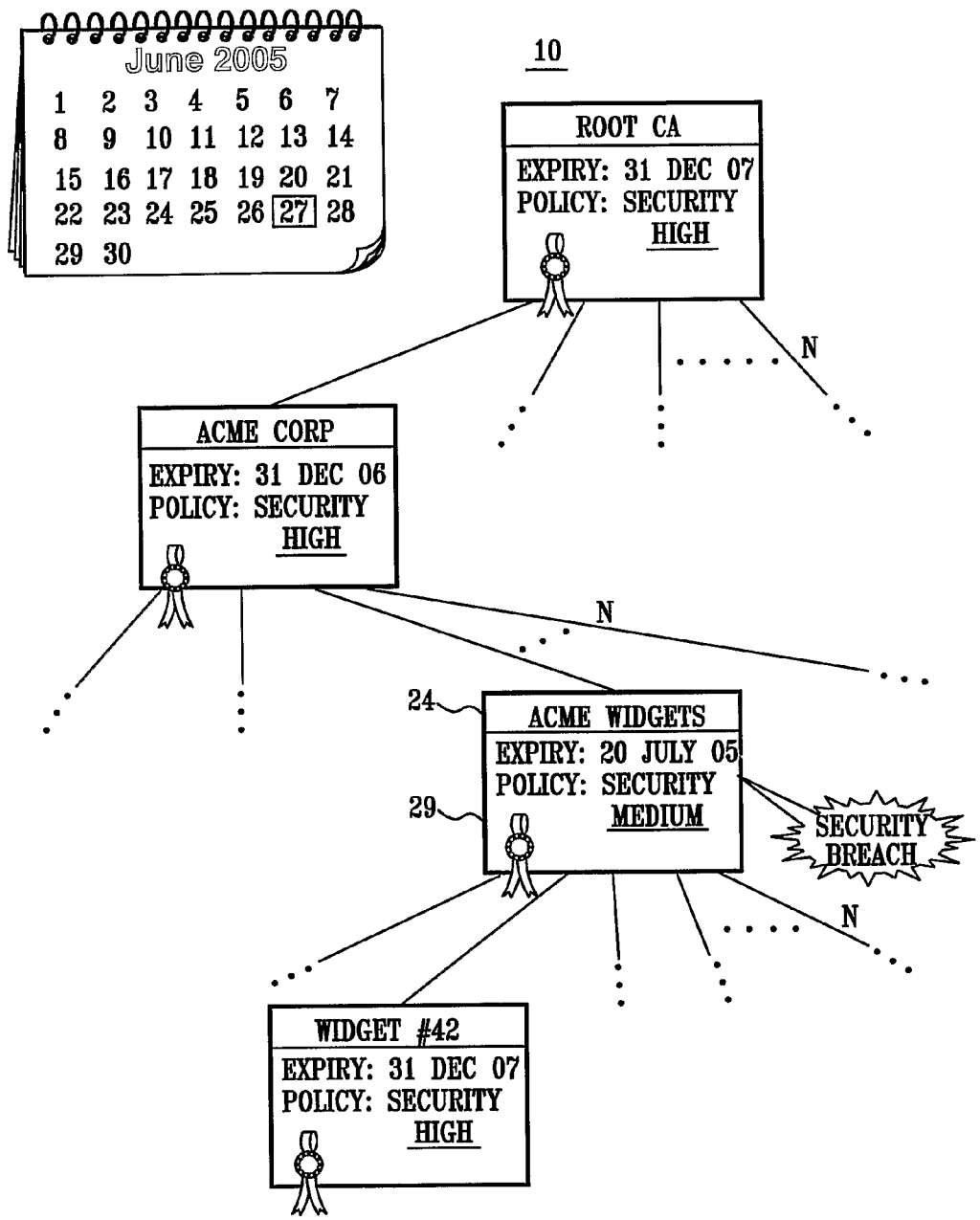
FIG. 4 is a partly pictorial, partly block diagram view of the system of FIG. 3, showing a security breach at one of the intermediate certificate authorities.

Reference is now made to FIG. 4, which is a partly pictorial, partly block diagram view of the system 10 of FIG. 3, showing a security breach at ACME widgets 24. On 27 Jun. 2005 there was a security breach at ACME widgets 24. Therefore, the security status of ACME widgets 24 needs to be downgraded from medium to low security. However, the certificate 29 of ACME widgets 24 does not expire until 20 Jul. 2005. There are two options available. One option is to revoke the certificate 29 of ACME widgets 24. The other option is to wait until the certificate 29 of ACME widgets 24 expires on 20 Jul. 2005 and replace the certificate 29 with a newly signed certificate having a low security policy.

Figure 5:
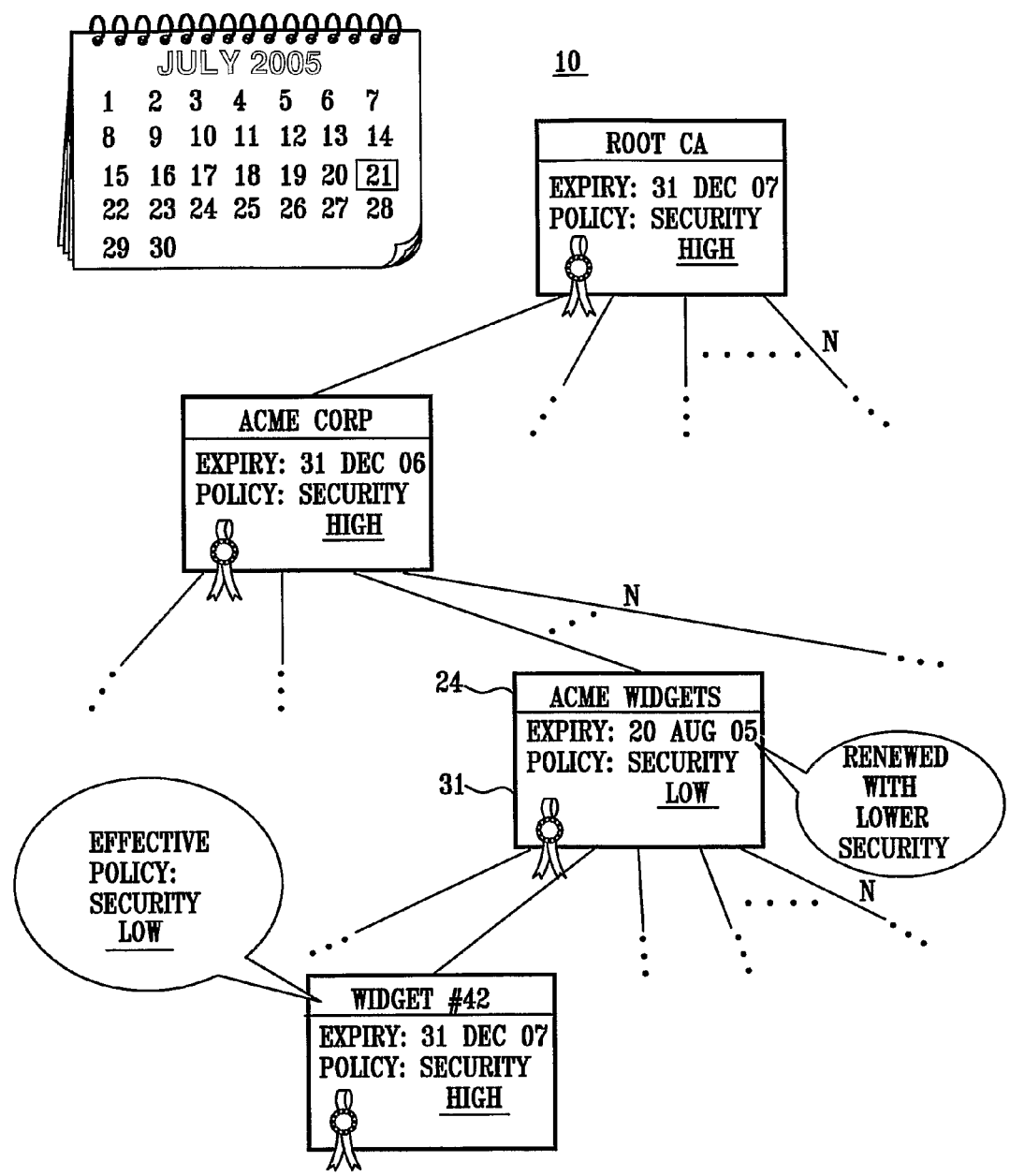
FIG. 5 is a partly pictorial, partly block diagram view showing the intermediate certificate authority of FIG. 4 being issued a newly signed certificate with a low security policy.

Reference is now made to FIG. 5, which is a partly pictorial, partly block diagram view showing ACME widgets 24 of FIG. 4 being issued with a newly signed certificate 31 having a low security policy. ACME Corp 22 signed the certificate 31 for ACME widgets 24. The certificate 31 has a start date of 21 Jul. 2005 and an expiration date of 20 Aug. 2005 and has a low security policy. Therefore, the effective policy of the certificate chain is now a low security policy.

Figure 6:
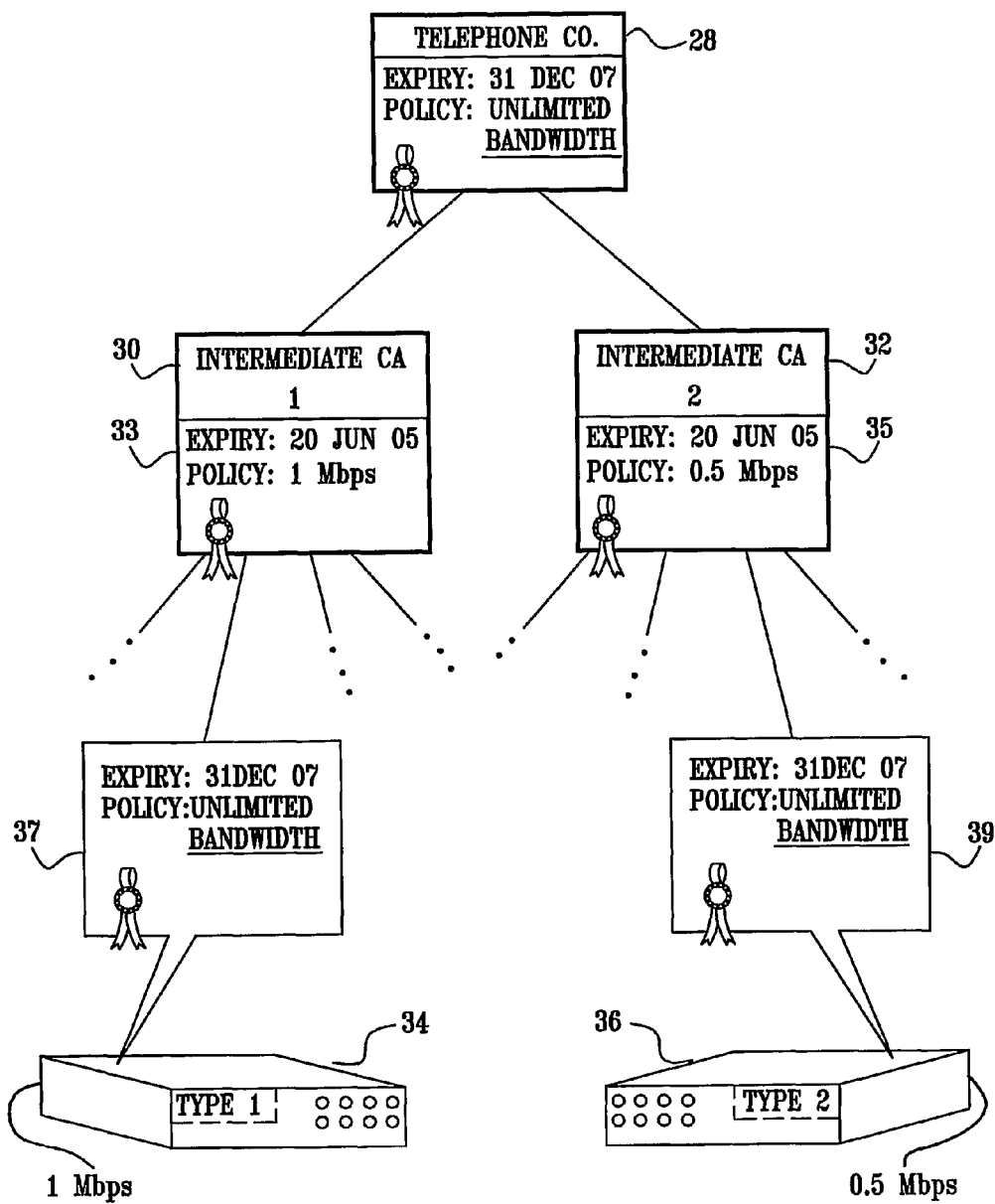
FIG. 6 is a partly pictorial, partly block diagram view of a certificate authority system for bandwidth control constructed and operative in accordance with a first alternative preferred embodiment of the present invention.

Reference is now made to FIG. 6, which is a partly pictorial, partly block diagram view of a CA system 26 for bandwidth control constructed and operative in accordance with a first alternative preferred embodiment of the present invention. In this example, a telephone company has type 1 modems and type 2 modems. A hierarchical CA structure is established including: a root CA 28; two intermediate CAs, namely a type 1 intermediate CA 30 and a type 2 intermediate CA 32; and a plurality of type 1 modems 34 (for clarity only one is shown in FIG. 6) and a plurality of type 2 modems 36 (for clarity only one is shown in FIG. 6) at the leaf level.

The root CA 28 signs a certificate 33 for the intermediate CA 30 and a certificate 35 for the intermediate CA 32. The certificate 33 for the intermediate CA 30 expires 20 Jun. 2005 and has a bandwidth policy of 1 Megabit per second (Mbps). The certificate 35 for the intermediate CA 32 expires 20 Jun. 2005 and has a bandwidth policy of 0.5 Mbps.

The intermediate CA 30 signs a plurality of certificates 37 (for clarity only one is shown in FIG. 6) for the modems 34, in the leaf level below the intermediate CA 30. The certificates 37 expire on 31 Dec. 2007 and have an unlimited bandwidth. The effective bandwidth policy of the modems 34 is 1 Mbps.

Similarly, the intermediate CA 32 signs a plurality of certificates 39 (for clarity only one is shown in FIG. 6) for modems 36, in the leaf level below the intermediate CA 32. The certificates 39 expire on 31 Dec. 2007 and have an unlimited bandwidth. The effective bandwidth policy of the modems 36 is 0.5 Mbps.

Figure 7:
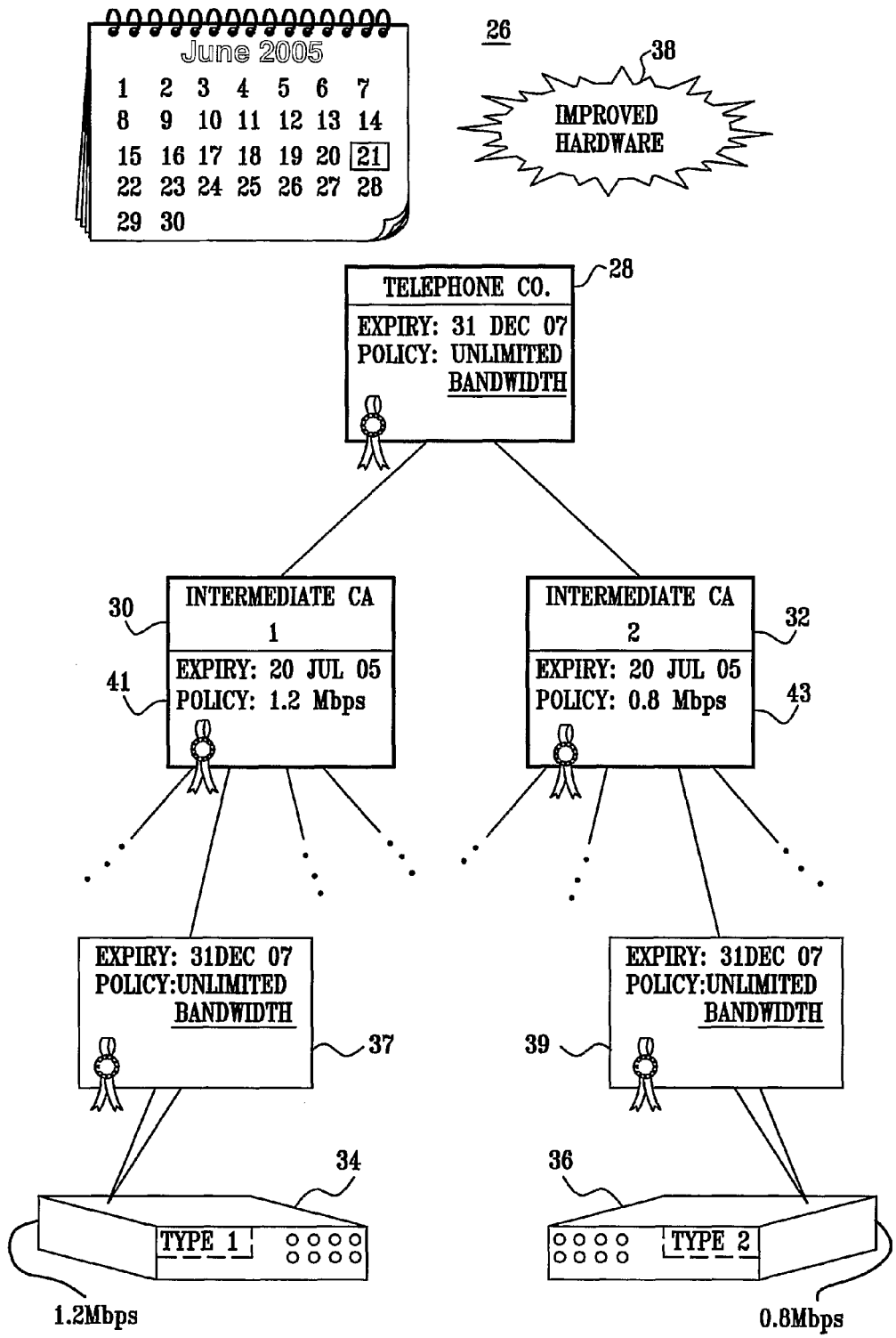
FIG. 7 is a partly pictorial, partly block diagram view of the system of FIG. 6 after improved hardware is installed.

Reference is now made to FIG. 7, which is a partly pictorial, partly block diagram view of the CA system 26 of FIG. 6 after an improved hardware system 38 is installed. During June 2005 the improved hardware system 38 was installed thereby allowing the bandwidth policy to be increased for all modems 34 (for clarity only one is shown in FIG. 7) and the modems 36 (for clarity only one is shown in FIG. 7). The CA system 26 enables updating the bandwidth policy for all the modems 34, 36 without revoking and/or reissuing the certificates 37 (for clarity only one is shown in FIG. 7) and the certificates 39 (for clarity only one is shown in FIG. 7) of all the individual modems 34, 36.

On 21 Jun. 2005, when the certificates 33, 35 (FIG. 6) held by the intermediate CA 30 and the intermediate CA 32 have already expired, a new certificate 41 and a new certificate 43 signed by the root CA 28 for the intermediate CA 30 and the intermediate CA 32, respectively, are now valid. The certificate 41 has a bandwidth policy of 1.2 Mbps and the certificate 43 has a bandwidth policy of 0.8 Mbps. Therefore, the effective bandwidth of the modems 34 is 1.2 Mbps and the effective bandwidth of the modems 36 is 0.8 Mbps.

Figure 8:
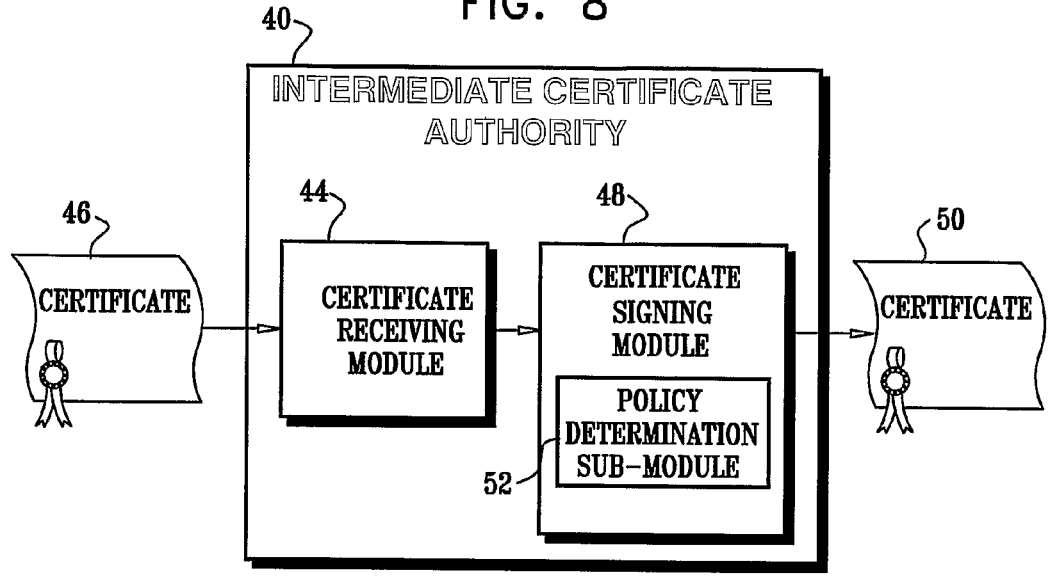
FIG. 8 is a simplified block diagram view of a preferred implementation of an intermediate certificate authority for use with the system of FIG. 1.
Figure 9:
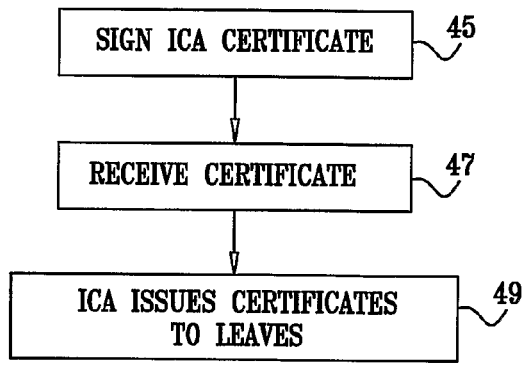
FIG. 9 is a flow chart showing the method of operation of the intermediate certificate authority of FIG. 8.

Reference is now made to FIGS. 8 and 9. FIG. 8 is a simplified block diagram view of an intermediate CA 40 for use with the system 10 of FIG. 1. FIG. 9 is a flow chart showing the method of operation of the intermediate CA 40 of FIG. 8. A certificate 46 is signed by a CA in a level above the level of intermediate CA 40 (block 45). The intermediate CA 40 preferably includes a certificate receiving module 44 to receive the certificate 46 (block 47).

The intermediate CA 40 also generally includes a certificate signing module 48 to sign a certificate 50 for a member of the HCAS 12 (FIG. 1), prior to the expiration of the certificate 46 (block 49). In other words, the certificate 50 is generally signed during the lifetime of the certificate 46. The certificate 50 generally expires after the expiration time of the certificate 46 so that the lifetime of the certificate 50 is longer than the lifetime of the certificate 46.

The certificate signing module 48 preferably includes a policy determination sub-module 52 to generally issue the certificate 50 with a policy such that the certificate 50 has a policy which allows at least one operation that the policy of the certificate 46 does not allow. It will be appreciated that communication at a first speed is a different operation from communication at a second speed. Similarly, processing data having a low security level is a different operation from processing data having a high security level. It will be appreciated by those ordinarily skilled in the art that many other examples of differing operations are available within the scope of the present invention. It will also be appreciated by those ordinarily skilled in the art that the policy determination sub-module 52 can issue the certificate 50 with the same policy, or a more stringent policy, than the policy of the certificate 46.

The certificates preferably certify aspects of the holder, for example, but not limited to, an identity of the certificate holder, a policy of the certificate holder, for example, but not limited to, a security policy and/or a bandwidth policy. The certificates typically include a public key of the holder. Additionally, the certificates are preferably signed by a private key corresponding to a public key of the signing CA in the level above holder of the certificate.

Figure 10:
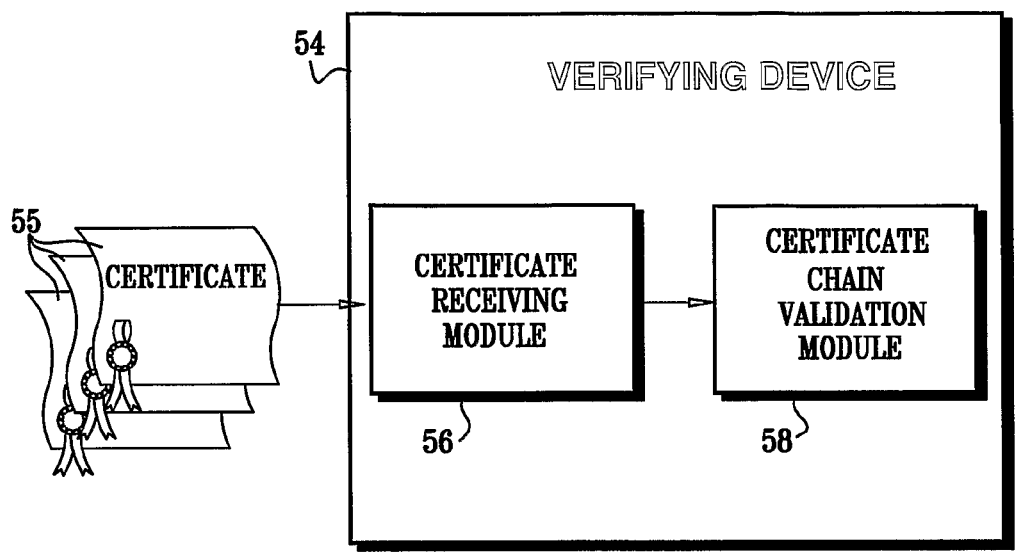
FIG. 10 is a simplified block diagram view of a preferred implementation of a verifying device for use with the system of FIG. 1.
Figure 11:
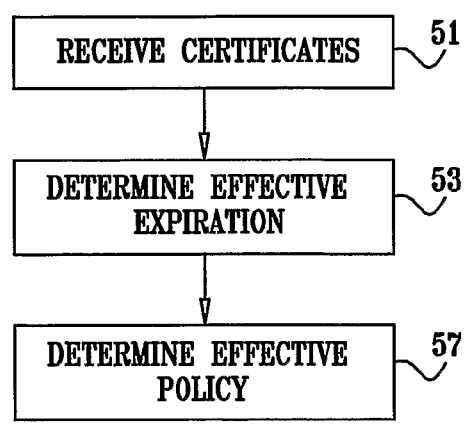
FIG. 11 is a flow chart showing the method of operation of the verifying device of FIG. 10.

Reference is now made to FIGS. 10 and 11. FIG. 10 is a simplified block diagram view of a verifying device 54 for use with the system 10 of FIG. 1. FIG. 11 is a flow chart showing the method of operation of the verifying device 54 of FIG. 10. The verifying device 54 is preferably adapted to validate a certificate chain having a plurality of certificates 55. The verifying device 54 typically includes a certificate receiving module 56 to receive the certificates 55 of the certificate chain (block 51). The verifying device 54 also generally includes a certificate chain validation module 58.

The certificate chain validation module 58 generally performs two tasks. First, the certificate chain validation module 58 typically determines an effective expiration date of the certificate chain as the earliest expiration date of all the certificates 55 in the certificate chain (block 53). The certificate chain validation module 58 does not generally require a check to be performed on the relative expiration dates of elements of the certificate chain. Second, the certificate chain validation module 58 preferably determines an effective policy of the certificate chain such that the effective policy only allows operations commonly permissible to each of the certificates 55 in the certificate chain (block 57).

Figure 12:
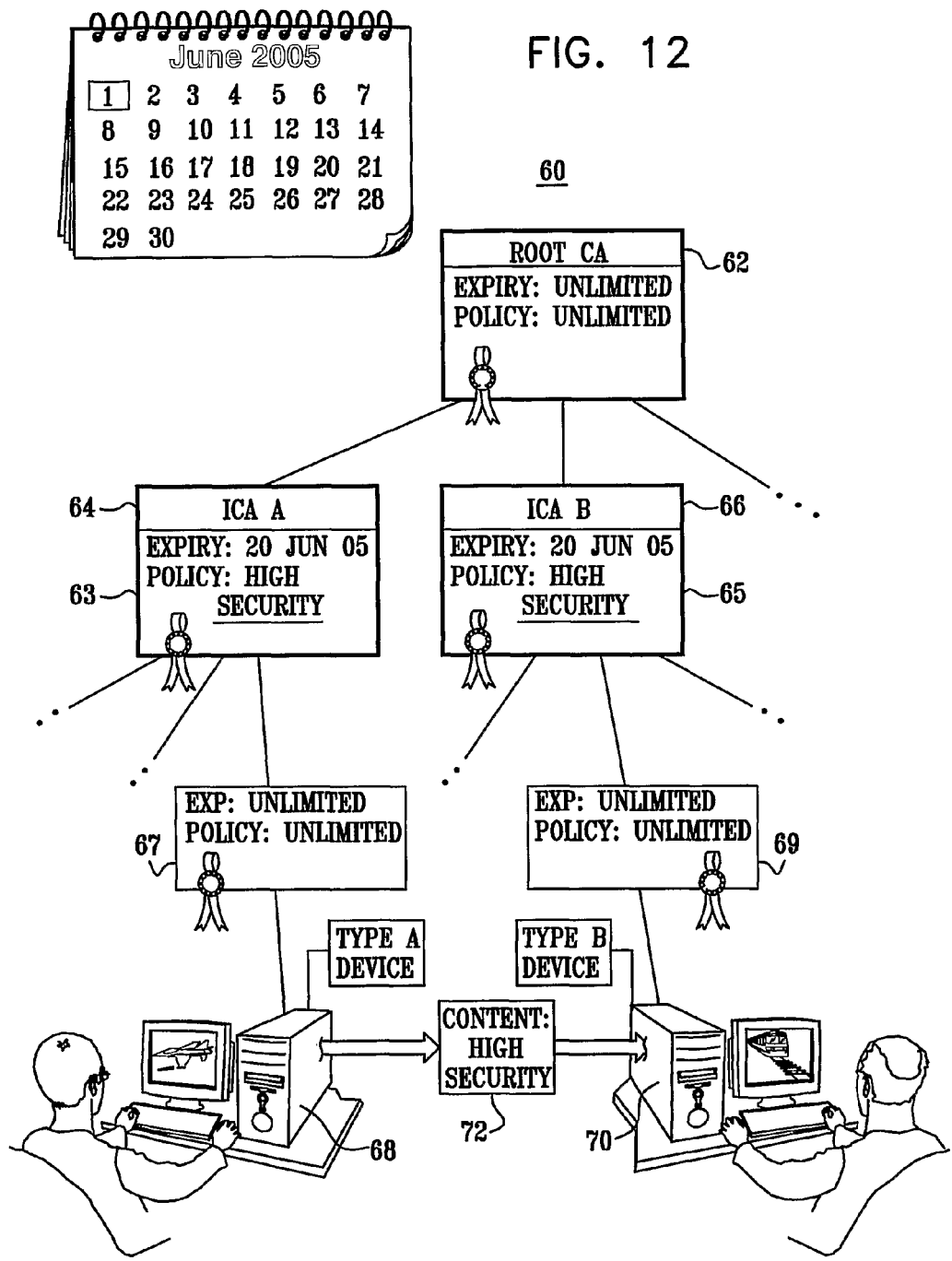
FIG. 12 is a partly pictorial, partly block diagram view of a certificate authority system for secure content control constructed and operative in accordance with a second alternative preferred embodiment of the present invention.

Reference is now made to FIG. 12, which is a partly pictorial, partly block diagram view of a CA system 60 for secure content control constructed and operative in accordance with a second alternative preferred embodiment of the present invention. The CA system 60 generally includes a root CA 62, a type A intermediate CA 64, a type B intermediate CA 66, a plurality of type A devices 68 (for clarity only one is shown in FIG. 12) in the leaf level and a plurality of type B devices 70 (for clarity only one is shown in FIG. 12) in the leaf level.

On 1 Jun. 2005 the root CA 62 signs a certificate 63, for the type A intermediate CA 64 The certificate 63 has an expiration date of 20 Jun. 2005 and a high security policy. At the same time, the root CA 62 signs a certificate 65, for the type B intermediate CA 66. The certificate 65 has an expiration date of 20 Jun. 2005 and a high security policy.

In turn, the type A intermediate CA 64 signs a plurality of certificates 67 (for clarity only one is shown in FIG. 12) for all the type A devices 68. The type B intermediate CA 66 signs a plurality of certificates 69 (for clarity only one is shown in FIG. 12) for all the type B devices 70. The certificates 67, 69 have an unlimited expiration and an unlimited policy.

Therefore, the effective expiration of the certificate chain for both the type A devices 68 and the type B devices 70 is 20 Jun. 2005. The effective policy of the certificate chain for both the type A devices 68 and the type B devices 70 is a high security policy.

The CA system 60 has a content transfer protocol whereby content is only generally transferred from one device to another if the receiving device has a certificate with a same or higher security policy than the content being transferred. For example, content 72 with a high security level can be sent from one of the type A devices 68 to one of the type B devices 70, as the receiving type B device 70 also has the certificate 69 with a high security policy.

Figure 13:
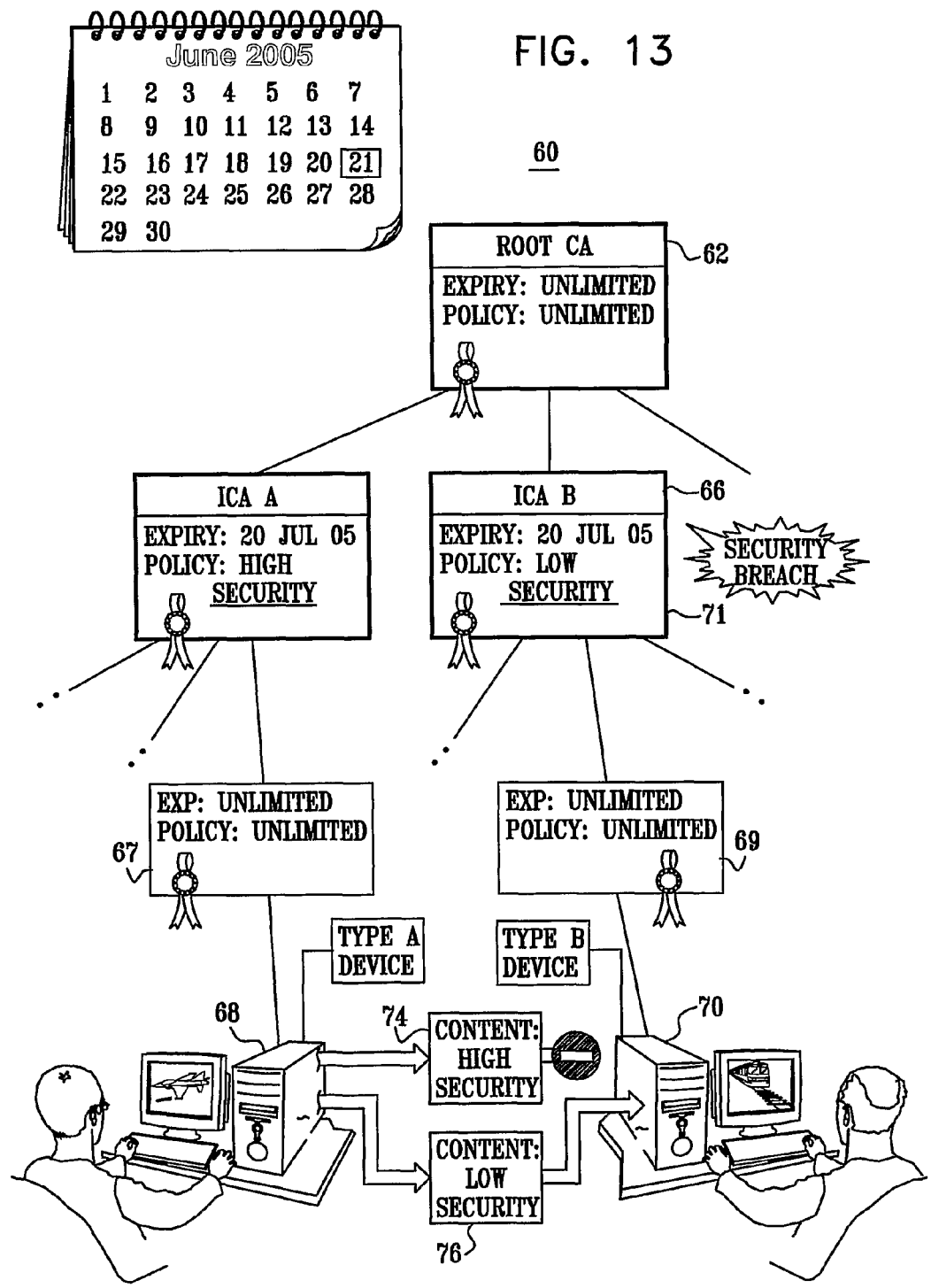
FIG. 13 is a partly pictorial, partly block diagram view of the system of FIG. 12 after a security breach.

Reference is now made to FIG. 13, which is a partly pictorial, partly block diagram view of the system 60 of FIG. 12 after a security breach. After a security breach at the type B intermediate CA 66 during June 2005, the security status of the type B intermediate CA 66 is typically downgraded from high to low security. This means that all type B devices 70 (for clarity only one is shown in FIG. 13) are also downgraded from high security to low security.

Instead of revoking or reissuing all the certificates 69 (for clarity only one is shown in FIG. 13) of the type B devices 70, the root CA 62 signs a new certificate 71, with a low security policy, for the type B intermediate CA 66. After the old certificate 65 (FIG. 12) expires on 20 Jun. 2005, the effective policy for the certificate chain of all the type B devices 70 is now a low security policy, as defined by the new certificate 71.

So for example, a high security content 74 is blocked from being sent by one of the type A devices 68 (for clarity only one is shown in FIG. 13) to one of the type B devices 70, whereas a low security content 76 is still allowed to be sent from the sending type A device 68 to the receiving type B device 70.

Figure 14:
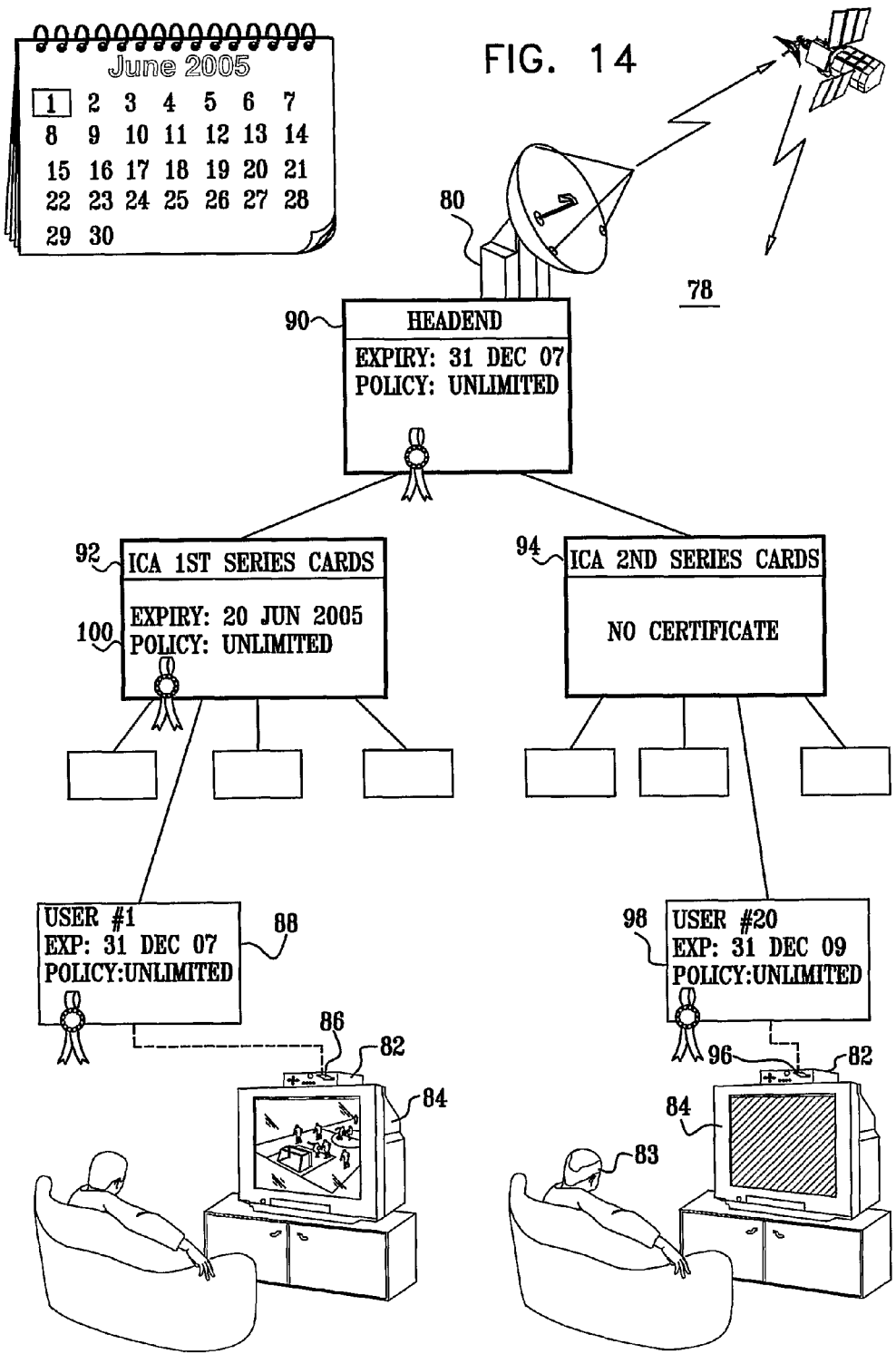
FIG. 14 is a partly pictorial, partly block diagram view of a certificate authority system for controlling series of smart cards constructed and operative in accordance with a third alternative preferred embodiment of the present invention.

Reference is now made to FIG. 14, which is a partly pictorial, partly block diagram view of a certificate authority system 78 for controlling series of smart cards constructed and operative in accordance with a third alternative preferred embodiment of the present invention. The certificate authority system 78 is generally part of a conditional access system for controlling viewer access to television.

The example of FIG. 14 depicts the television broadcaster as a satellite television broadcaster 80. However, it will be appreciated by those ordinarily skilled in the art that the certificate authority system 78 can be used by any suitable broadcaster, including, but not limited to, a cable television or terrestrial broadcaster.

Encrypted television programs received from the television broadcaster 80 are generally decrypted by a set top box 82 which is connected to a television 84. However, decryption by the set top box 82 is typically dependent upon whether the viewer has access rights to the television programs. Access rights are generally controlled via a smart card which is inserted into the set top box 82, as will be described below.

Initially, the television broadcaster 80 issues a first series of smart cards 86 (for clarity only one is shown in FIG. 14). Each smart card 86 preferably has a certificate 88 (for clarity only one is shown in FIG. 14). The certificates 88 are typically used by the set top boxes 82 to verify that the smart cards 86 are valid and therefore that the viewer is entitled to view the television programs.

The television broadcaster 80 knows that after a period of time, the first series of smart cards 86 will need to be replaced by a second series of smart cards 96 (for clarity only one is shown in FIG. 14). However, the broadcaster 80 does not know when the first series of smart cards 86 will be replaced by the second series of smart cards 96. Therefore the television broadcaster 80 typically has three options.

The first option is to sign the certificates 88 with very short lifetimes so that when the television broadcaster 80 decides to issue the second series of smart cards 96, the television broadcaster 80 simply waits a short period of time until the certificates 88 expire. This is option is problematic because of the heavy processing associated with continual renewal of the certificates 88 as well as the large bandwidth used to transmit the certificates 88 to the smart cards 86.

The second option is to issue the certificates 88 to the smart cards 86 with a medium to long lifetime and then revoke the certificates 88 when the television broadcaster 80 decides to issue the second series of smart cards 96.

The third option is described below, by way of a non-limiting example.

The certificate authority system 78 preferably includes a Headend root CA 90, a 1st series intermediate CA 92 and a 2nd series intermediate CA 94 and a plurality of leaf members. The leaf members are the smart cards 86 and the smart cards 96. The smart cards 86 are children of the 1st series intermediate CA 92, and the smart cards 96 are children of the 2nd series intermediate CA 94.

On 1 Jun. 2005, the Headend root CA 90 signs a certificate 100 for the 1st series intermediate CA 92. The certificate 100 has a short lifetime and expires on 20 Jun. 2005. However, the 2nd series intermediate CA 94 does not have a valid certificate from the Headend root CA 90 at present. The 1st series intermediate CA 92 signs the certificates 88 for the smart cards 86. The 2nd series intermediate CA 94 signs a plurality of certificates 98 (for clarity only one is shown in FIG. 14) for the smart cards 96.

The first series of the smart cards 86 are issued with the certificates 88 thereon. The certificates 88 have a very long lifetime. In the example of FIG. 14, the certificates 88 expire 31 Dec. 2007. Similarly, the second series of smart cards 96 are issued with the certificates 98 thereon. The certificates 98 also have a very long lifetime. In the example of FIG. 14, the certificates 98 expire 31 Dec. 2009.

It is seen that the certificate chain for the certificates 88 expires on 20 Jun. 2005. The certificate chain for the certificates 98 is invalid as 2nd series intermediate CA 94 does not have a valid certificate. Therefore, the first series of smart cards 96 are validated by the set top boxes 82. However, the second series of smart cards 96 are not validated by the set top boxes 82 and therefore, a viewer 83 using one of the smart cards 96 is generally unable to decrypt, and therefore unable to view, the television programs.

Figure 15:
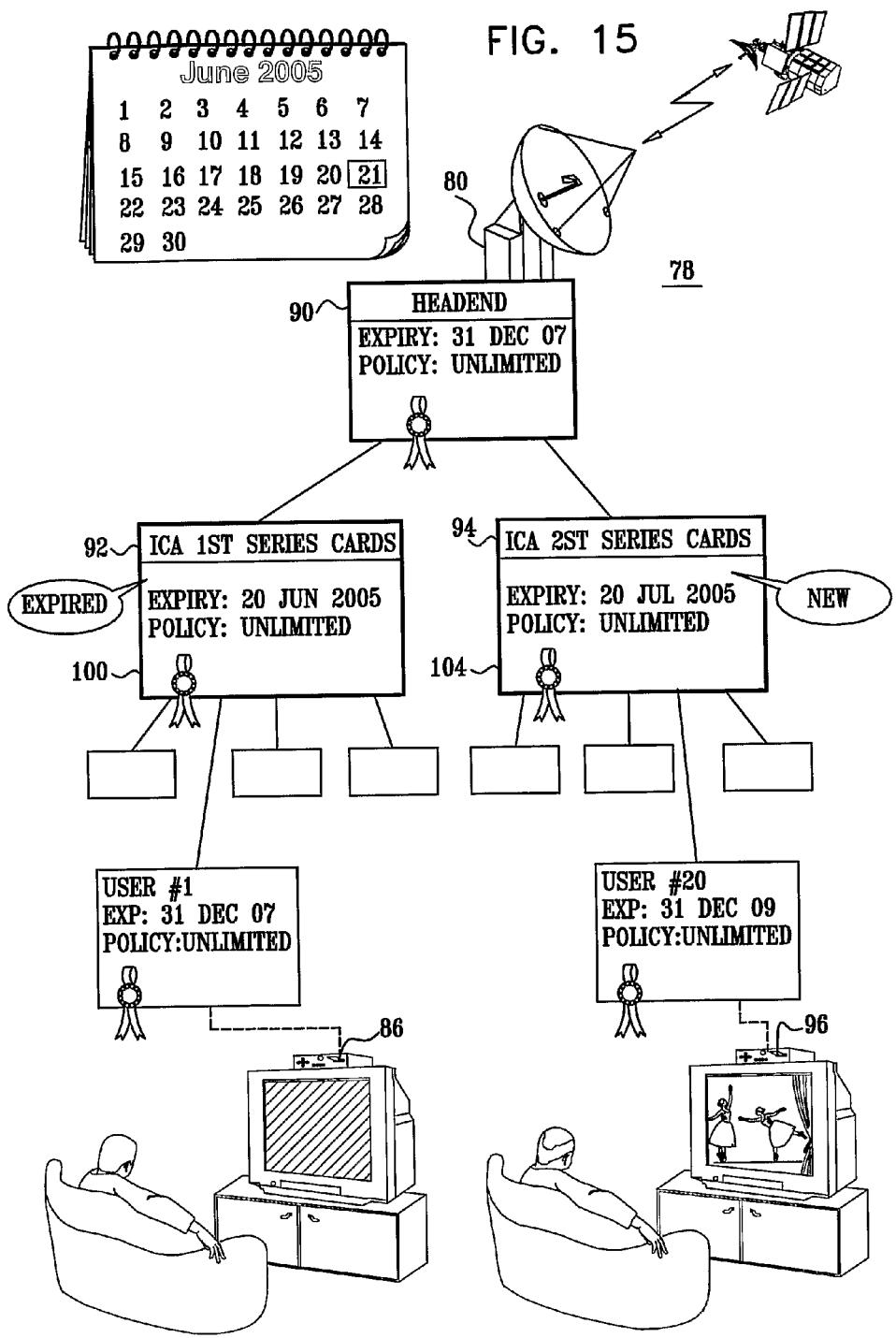
FIG. 15 is a partly pictorial, partly block diagram view of the system of FIG. 14 after the old card certificate chain has expired.

Reference is now made to FIG. 15, which is a partly pictorial, partly block diagram view of the system 78 of FIG. 14 after the first series smart card certificate chain has expired. The television broadcaster 80 decided after 1 Jun. 2005 to discontinue using the first series of smart cards 86 (for clarity only one is shown in FIG. 15) and permit use of the second series of smart cards 96 (for clarity only one is shown in FIG. 15), following successful delivery of the second series of smart cards 96 to all the customers. Therefore, when the certificate 100 of the 1st series intermediate CA 92 expired on 20 Jun. 2005, the television broadcaster 80 instructs the Headend root CA 90 not to renew the certificate 100. Additionally, the television broadcaster 80 instructs the Headend root CA 90 to sign a certificate 104 for 2nd series intermediate CA 94 which is valid from 21 Jun. 2005. Therefore, the certificate chain of the second series of smart cards 96 is now valid.

It will be appreciated by those ordinarily skilled in the art that instead of discontinuing use of the smart cards 86 and permitting use of the smart cards 96 without any overlap between the two series of smart cards 86, 96, the television broadcaster 80 can allow an overlap period where both the series of smart cards 86, 96 are permitted. This is achieved by the Headend root CA 90 issuing both the 1st series intermediate CA 92 and the 2nd series intermediate CA 94 with valid certificates for the overlap period.

It should be noted that certificates generally have start and end dates. Therefore, a certificate can be created and signed and delivered prior to the period of validity of the certificate, thereby preventing periods were no valid certificate exists.

The above examples all relate to using a certificate for trust establishment between a client and a device holding the certificate. In accordance with a preferred embodiment of the present invention, a certificate is used to configure the device holding the certificate in accordance with the contents of the certificate. This is known as secure self configuration. Secure self configuration is now described with reference to FIGS. 16-19.

Figure 16:
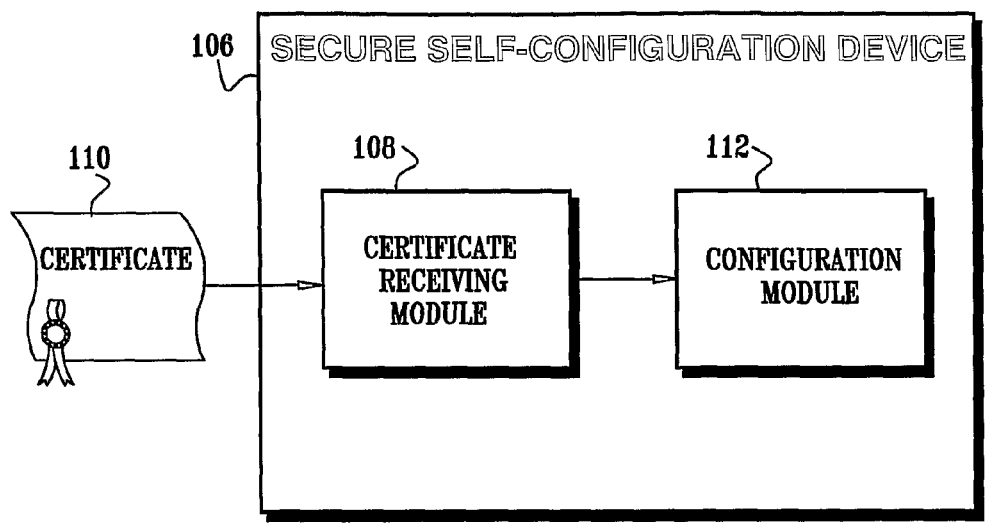
FIG. 16 is a simplified block diagram of a secure self-configuration device constructed and operative in accordance with a preferred embodiment of the present invention.
Figure 17:
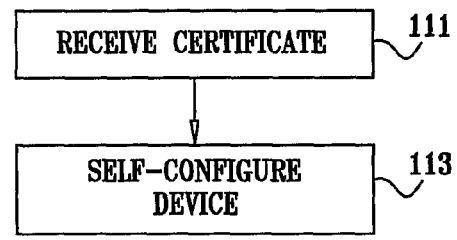
FIG. 17 is a flow chart showing the method of operation of the secure self-configuration device of FIG. 16.

Reference is now made to FIGS. 16 and 17. FIG. 16 is a simplified block diagram of a secure self-configuration device 106 constructed and operative in accordance with a preferred embodiment of the present invention. FIG. 17 is a flow chart showing the method of operation of the secure self-configuration device 106 of FIG. 16. The secure self-configuration device 106 preferably includes a certificate receiving module 108 to receive a certificate 110 (block 111) from a certificate authority (not shown). The certificate 110 typically certifies an aspect of the secure self-configuration device 106, for example, but not limited to, a security and/or bandwidth policy. The secure self-configuration device 106 also preferably includes a configuration module 112 to self-configure the device based on the aspect of the certificate 110 (block 113).

Reference is now made to FIG. 18, which is a partly pictorial, partly block diagram view of a certificate authority system 114 for use with the secure self-configuration device 106 of FIG. 16 constructed and operative in accordance with a fourth alternative preferred embodiment of the present invention. The certificate authority system 114 is typically part of a conditional access system for controlling viewer access to television.

The example of FIG. 18 depicts the television broadcaster as a satellite television broadcaster 116. However, it will be appreciated by those ordinarily skilled in the art that certificate authority system 114 can be used by any suitable broadcaster, including, but not limited to, a cable television or terrestrial broadcaster.

The television broadcaster 116 issued a plurality of smart cards 122.

Both a plurality of old set top boxes 118 (for clarity only one is shown in FIG. 18) and a plurality of new set top boxes 120 (for clarity only one is shown in FIG. 18) are being used by the viewers to decode the encrypted broadcasts. The old set top boxes 118 use an old, less secure, security protocol with the smart cards 122. The new set top boxes 120 are able to operate under the old security protocol and a new, more secure, security protocol with the smart cards 122.

Currently, the television broadcaster 116 wants to allow use of both the old and the new security protocol. However, when all the viewers have received the new set top boxes 120, the television broadcaster 116 will discontinue allowing the old security protocol.

This problem is generally solved by certificate authority system 114, now described below.

The certificate authority system 114 preferably includes a Headend root CA 124 and an intermediate CA 126 and a plurality of leaf members, the leaf members being the smart cards 122. The Headend root CA 124 typically signs a certificate 128 for the intermediate CA 126. The intermediate CA 126 generally signs a plurality of certificates 130. Each of the certificates 130 is preferably associated with one of the smart cards 122.

The certificate 128 has a short expiry date, 20 Jun. 2005 in this example. The certificates 130 have a long expiry date, 31 Dec. 2007 in this example. The certificate 128 has a policy which allows both the old and new security protocol. The certificates 130 have an unlimited policy. Therefore, the effective policy of the certificate chain of the smart cards 122 is to allow both the old and new security protocol. Therefore, both the old set top boxes 118 and the new set top boxes 120 operate with the smart cards 122.

It should be noted that the smart cards 122 validate the certificate chain of the certificates 130. Therefore, the smart cards 122 are validating their own certificates 130. Therefore, the smart cards 122 configure themselves based on the certificates 130, for example, but not limited to, configuring themselves regarding which security protocol to allow with the set top boxes 118, 120. This is an example of secure self configuration.

Reference is now made to FIG. 19, which is a partly pictorial, partly block diagram view of the system 114 of FIG. 18 after the all the new boxes 120 have been delivered. During June 2005 all the viewers received the new set top boxes 120 (for clarity only one is shown in FIG. 19). Therefore, when the certificate 128 (FIG. 18) of the intermediate CA 126 expired on 20 Jun. 2005, it was replaced by a new certificate 132 signed by the Headend root CA 124.

The new certificate 132 has a policy which only allows the new security protocol and not the old security protocol. Therefore, the effective policy of the certificate chain of the smart cards 122 is to allow the new security protocol and not the old security protocol. Therefore, a viewer 134 using one of the old set top boxes 118 (for clarity only one is shown in FIG. 19) is not able to view programs on his television 136.

It will be appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable sub-combination.

It will also be appreciated by persons skilled in the art that the present invention is not limited by what has been particularly shown and described hereinabove. Rather the scope of the invention is defined only by the claims which follow.

What is claimed is:

1. An intermediate certificate authority (ICA) for a hierarchical certificate authority structure (HCAS), the HCAS having a plurality of levels, the levels including a root level, at least one intermediate level, and a leaf level, the root level having a root certificate authority, the ICA being in the at least one intermediate level, the ICA comprising:

a certificate receiving module to receive a first certificate from a certificate authority in a level above the level of the ICA, the first certificate certifying an aspect of the ICA, the first certificate having: a policy associated with the ICA; and a lifetime; and a certificate signing module to sign a second certificate for a member of the HCAS, during the lifetime of the first certificate, such that the second certificate has a policy which allows at least one operation that the policy of the first certificate does not allow, the member being in a level below the level of the ICA, the second certificate certifying an aspect of the member.

2. The ICA according to claim 1, wherein the member is a smart card.

3. The ICA according to claim 1, wherein the member is part of a conditional access system.

4. The ICA according to claim 1, wherein the policy is a security policy.

5. The ICA according to claim 1, wherein the policy is a bandwidth policy.

6. The ICA according to claim 1, wherein the first certificate and the second certificate include a public key and an identity of a certifying entity.

7. The ICA according to claim 6, wherein the first certificate and the second certificate are signed by a private key corresponding to a public key of the level above the ICA and the member, respectively.

8. A method for issuing certificates in a hierarchical certificate authority structure (HCAS), the HCAS having a plurality of levels, the levels including a root level, at least one intermediate level, and a leaf level, the root level having a root certificate authority, the at least one intermediate level having an intermediate certificate authority (ICA), the method comprising:

receiving a first certificate from a certificate authority in a level above the level of the ICA, the first certificate certifying an aspect of the ICA, the first certificate having a policy associated with the ICA; and signing a second certificate for a member of the HCAS, during a lifetime of the first certificate, such that the second certificate has a policy which allows at least one operation that the policy of the first certificate does not allow, the member being in a level below the level of the ICA, the second certificate certifying an aspect of the member.

* * * * *

UNITED STATES PATENT AND TRADEMARK OFFICE
CERTIFICATE OF CORRECTION

| | | |
|---|---|---|
| PATENT NO. | : 8,181,017 B2 | Page 1 of 1 |
| APPLICATION NO. | : 11/587714 | |
| DATED | : May 15, 2012 | |
| INVENTOR(S) | : Reuben Sumner et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1,316 days.

Signed and Sealed this
Fourteenth Day of August, 2012

David J. Kappos
*Director of the United States Patent and Trademark Office*

UNITED STATES PATENT AND TRADEMARK OFFICE
CERTIFICATE OF CORRECTION

PATENT NO. : 8,181,017 B2
APPLICATION NO. : 11/587714
DATED : May 15, 2012
INVENTOR(S) : Reuben Summer et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1,487 days.

Signed and Sealed this
Fifth Day of February, 2013

Teresa Stanek Rea
*Acting Director of the United States Patent and Trademark Office*